United States Patent [19]
Maeda et al.

[11] Patent Number: 4,607,358
[45] Date of Patent: Aug. 19, 1986

[54] OPTICAL MEMORY APPARATUS

[75] Inventors: Takeshi Maeda; Motoo Uno, both of Kokubunji; Kouji Muraoka, Hachioji; Masahiro Takasago, Odawara; Yasumitsu Mizoguchi, Odawara; Tokuya Kaneko, Odawara, all of Japan

[73] Assignee: Hitachi, Ltd., Tokyo, Japan

[21] Appl. No.: 736,125

[22] Filed: May 20, 1985

Related U.S. Application Data

[63] Continuation of Ser. No. 443,399, Nov. 22, 1982, abandoned.

[30] Foreign Application Priority Data

Nov. 25, 1981 [JP] Japan .................. 56-187869
Mar. 30, 1982 [JP] Japan .................. 57-50035

[51] Int. Cl.⁴ .............................................. G11B 7/00
[52] U.S. Cl. ...................................................... 369/44
[58] Field of Search ................ 358/342; 369/43–46, 369/111, 121; 250/201–204

[56] References Cited

U.S. PATENT DOCUMENTS 3,894,276 7/1975 Janssen ............................ 369/44 X
4,004,081 1/1977 Zorn ................................ 369/44 X
4,037,252 7/1977 Janssen .
4,106,058 8/1978 Romeas et al. .
4,138,663 2/1979 Lebureau .
4,142,209 2/1979 Hedlund et al. .
4,236,232 11/1980 Jansen et al. .
4,425,043 1/1984 Rosmalen ......................... 356/375

FOREIGN PATENT DOCUMENTS 2439450 5/1980 France .
2000612 1/1979 United Kingdom .
2034080 5/1980 United Kingdom .

Primary Examiner—Robert L. Richardson
Attorney, Agent, or Firm—Antonelli, Terry & Wands

[57] ABSTRACT

In an optical memory apparatus wherein predetermined information is optically recorded on a recording medium along guide grooves previously formed and then played back; an optical memory apparatus wherein, using a tracking signal and a signal indicating the quantity of reflected light at the time at which a projected light beam passes through the guide grooves, the directions in which the light beam passes through the grooves and the number of the guide grooves to be passed are detected, a seek control is performed by adding and subtracting the numbers of the guide grooves to be passed, depending upon the directions of passage, and fine positioning is thereafter performed by the use of the tracking signal.

23 Claims, 49 Drawing Figures

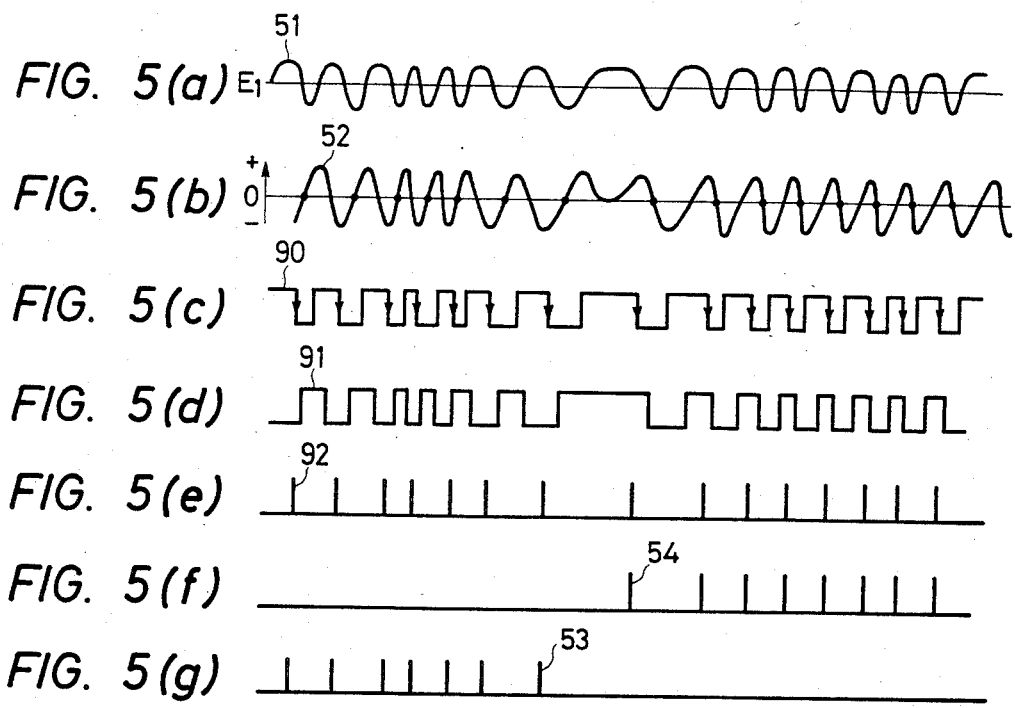
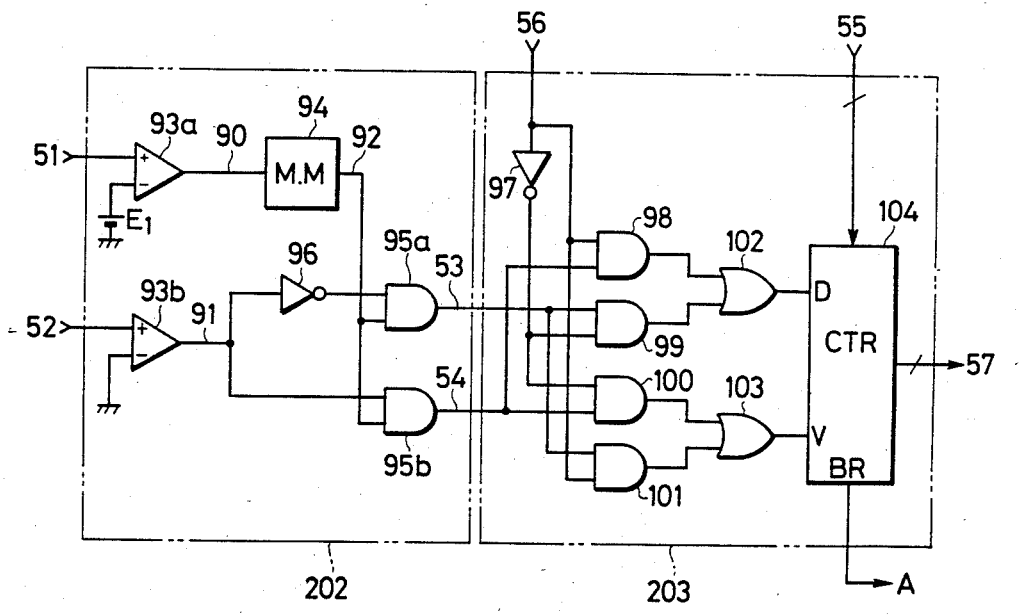

FIG. 7
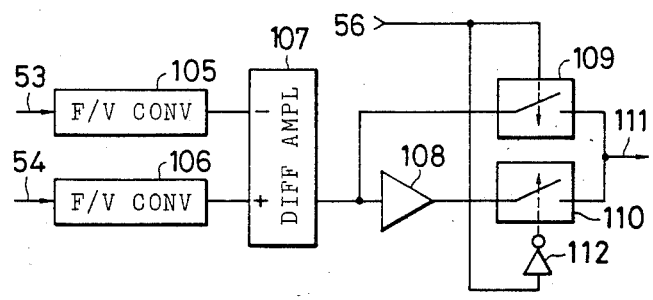
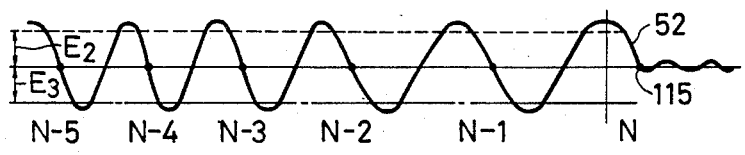
FIG. 8(a)
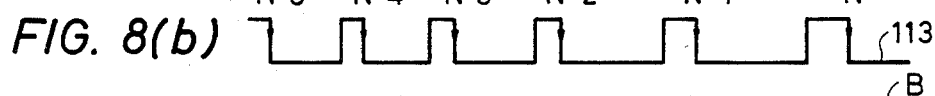
FIG. 8(b)
FIG. 8(c)
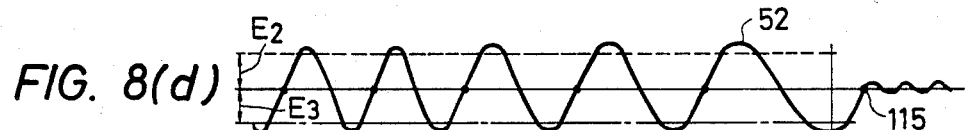
FIG. 8(d)
FIG. 8(e)
FIG. 8(f)
FIG. 8(g)

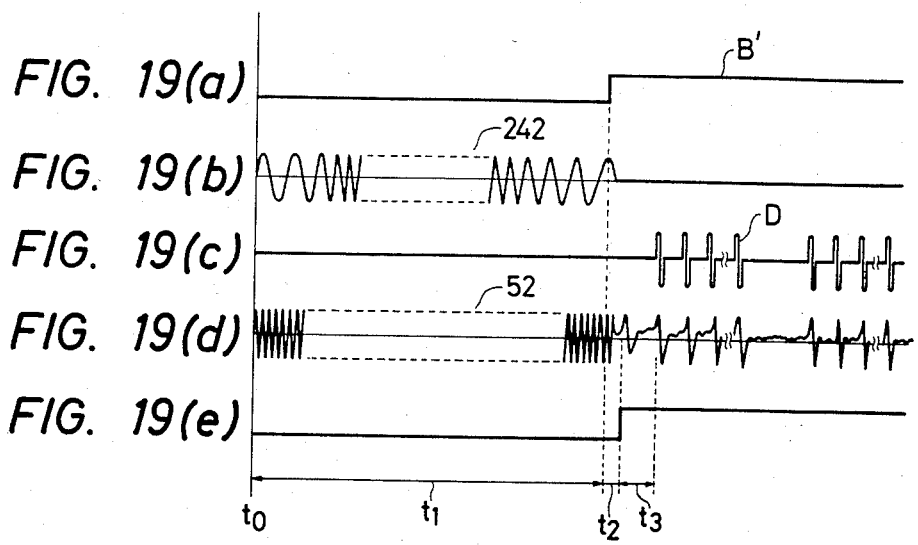
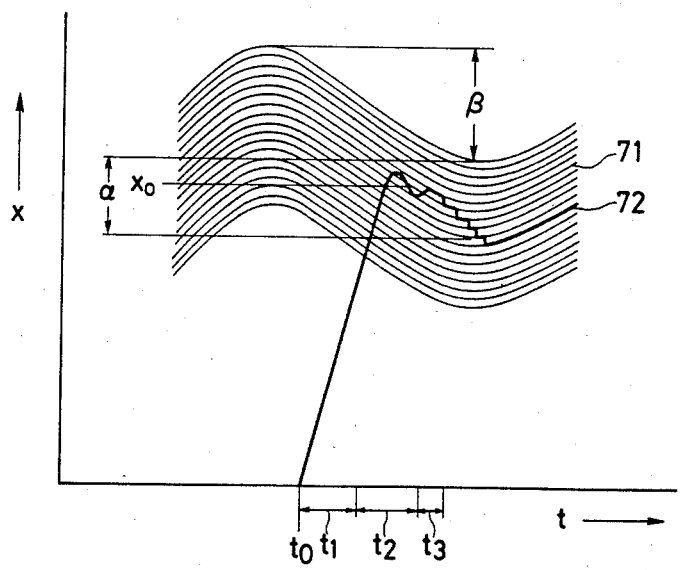

OPTICAL MEMORY APPARATUS

This in a continuation of application Ser. No. 443,399, filed Nov. 22, 1982, and now abandoned.

BACKGROUND OF THE INVENTION

The present invention relates to an optical memory apparatus which records and plays back information optically. More particularly, it relates to an access device for positioning a light beam to a desired guide groove.

At present, an optical memory apparatus called "optical disc" has been proposed wherein a rotary disc, in which a predetermined substrate is vapor-coated with an information recording medium (e.g., a metal film), is irradiated with a laser beam which is focused into a spot of approximately 1 μm in diameter and the irradiation power of which is modulated thereby to thermally provide recesses (called "pits") in the recording medium and to record information, and wherein at playback, a feeble laser beam is condensed and projected on the recording medium, and the information is read by utilizing variation in the quantity of reflected light from the pits. Such proposal has been made in 'Electronics', Nov. 23, 1978, p. 75, "Ten Billion Bits Fit onto Two Sides of 12-inch disc". A typical example of arrangement of the memory apparatus is shown in FIG. 1.

Here, a disc (partly broken away in the illustration of the figure) 3 having a diameter of approximately 30 cm is being rotated in the direction of an arrow about a rotary shaft 4 by a driving motor 5. An optical head 2, which is constructed of a laser source and an optical system, is carried on a swing arm actuator 1 having been used in a magnetic disc etc. and is driven in the radial direction of the disc 3.

The disc 3 has its surface covered with a transparent protective film 6 of glass or the like. In the figure, the protective film 6 is further partly broken away, to illustrate pits 12 to be described later.

Methods of recording and playing back information in such arrangement will be described with reference to FIG. 2 in which the illustrated part A of the disc 3 is shown on an enlarged scale.

On a substrate 11 of glass or plastic, guide grooves (called "tracks") 13 of a concave sectional structure having a certain degree of width and depth are formed by the use of an ultraviolet-setting resin 14 or the like. Further, a metal film 10 is evaporated on the resin 14, whereupon the protective film 6 is deposited. In case of recording, the focused spot of light from the optical head 2 is guided along the guide grooves 13, that is, the light spot tracks the guide grooves 13, and the metal film 10 is dissolved by the light spot so as to form the pits 12. In case of playback, a light spot is similarly projected along the guide grooves 13, and the quantity of the resulting reflected light is read.

Further, signals for controlling the light spot are detected from the quantity of the reflected light. The signals for controlling the light spot are, in the main, the two of a focal deviation detecting signal for detecting a focal deviation ascribable to the vertical oscillations of the disc, and a tracking deviation detecting signal for detecting the deviation between the center of the light spot and the center line of the guide groove. All such signals use the quantity of the reflected light from the metal film, namely, the area other than the pits.

Assuming the pitches of the guide grooves to be 1.6 μm, one side of the disc having a diameter of 300 mm is provided with about 50,000 guide grooves, and data to be received per guide groove become about 4,000 bytes.

In each guide groove, a plurality of sectors for indicating the limits of the data are provided in the rotational direction of the disc in advance. In recording an external information at any desired position or playing back the recorded information, the access operation of looking for one guide groove out of the surface of the disc and finding out one sector on this guide groove is required. That is, there are required the so-called "seek" operation of moving the light spot to a selected guide groove where desired information is recorded or is to be recorded, and the so-called tracking of maintaining the light spot on the center line of the guide groove with the minimum deviation throughout the period of time during which the information is being read or being recorded.

As an apparatus requiring such access operation, there has heretofore been the magnetic disc. Since, however, the track pitches of the magnetic disc are about 150 μm to 30 μm and are one order to two orders greater than the pitches of the guide grooves of the optical disc, positioning based on the same access operation as in the magnetic disc cannot be applied to the optical disc. More specifically, when a magnetic head is brought to a desired track by an actuator (for example, a voice coil type linear motor), a steady state error (an offset from the target position) of about 5-10 μm develops though it differs depending upon the construction and performance of the actuator. It is caused by friction etc. Moreover, in the transient state of the positional control, an overshoot can take place with respect to the target position, and it amounts to about 5 μm. In this manner, with the access means employed in the magnetic disc, the stop precision is as very low as about 10 μm. Since, as described before, the pitches of the guide grooves of the optical disc are about 1.6 μm at the least for the time being, the positioning of the optical disc is difficult with the access method of the magnetic disc.

Besides, in cases where the actuator undergoes the maximum acceleration and the macimum deceleration, it is feared that the actuator itself will vibrate in the order of μm. This leads to the problem that information from the disc cannot be read out during the seek control.

Furthermore, unlike the magnetic disc, the optical disc does not include a disc and a servo head for positioning. This leads to the problem that the exact position for the optical head cannot be detected.

SUMMARY OF THE INVENTION

An object of the present invention is to solve the problems described above, and to provide an optical memory apparatus which can perform positioning of high precision.

In order to achieve high-precision positioning, first of all, the exact position of an optical head under an access operation must be detected. To this end, it is considered to use a tracking deviation signal (tracking signal) at the time at which a light spot passes through a guide groove (track). However, in case of executing the seek control and the follow-up control by the use of this signal, the following disadvantage is involved. At the start and end of the seek control, the moving speed of the optical head becomes very low. When this speed has become lower than the eccentric maximum speed caused by the eccentricity of tracks, a miscount occurs in case of counting the number of tracks each time one track is passed, so that an exact position cannot be detected.

More specifically, referring to FIG. 3, the trace 40 of the light spot corresponds to a case where the light spot has passed through a group of eccentric tracks at the maximum speed of the eccentricity. Individual solid lines represent the variations-with-time of the positions of the tracks in the radial direction of the disc. In this case, the count value of the passage through the tracks and the number of the tracks having been passed are in agreement. In contrast, the trace 41 of the light spot corresponds to a case where the light spot has passed through the group of tracks at a speed lower than the maximum speed of the eccentricity. In this case, the count value of the passage through the tracks does not agree with the number of the tracks having been actually passed, but the former is larger.

In the present invention, therefore, the direction in which the light spot passes through the guide groove (track) and the number of the guide grooves which have been passed are detected by the use of a signal indicating the total quantity of reflected light at the passage of the light spot through the guide groove and the tracking deviation signal (tracking signal), and the addition or subtraction of the guide grooves passed in executed in accordance with the direction of the passage, thereby to detect the exact position of the optical head, that is, the light spot.

Alternatively, the optical head is provided with a scale, by means of which the position of the optical head under the access operation is exactly detected without detecting the passage of the light spot through the guide groove.

Further, the present invention comprises a first actuator which has a movable range extending over a full radius of the disc, and a second actuator which has a minute variable range and which exhibits a high responsibility. Thus, a positioning precision unattainable with only one actuator is realized by interlocking the two actuators. At this time, a method of controlling the two actuators becomes a problem. In the present invention, the problem is solved in such a way that the movement of the second actuator for high-precision positioning is detected, and that the first actuator for approximate positioning over the full radius of the disc is driven in interlocking with the detected movement.

BRIEF DESCRIPTION OF THE DRAWINGS

FIGS. 5(a) thru 5(g) are waveform diagrams for explaining a position detecting method;

FIG. 6 is a circuit block diagram for explaining positional detection;

FIG. 7 is a circuit block diagram for explaining speed detection;

FIGS. 8(a) thru 8(g) are waveform diagrams for explaining the timings of the positional control;

FIGS. 19(a) thru 19(e) is time charts showing the signal waveforms of various parts in the embodiment of FIG. 18;

FIG. 20 is an explanatory diagram showing the trace of a light spot;

DESCRIPTION OF THE PREFERRED EMBODIMENTS

Figure 4A:
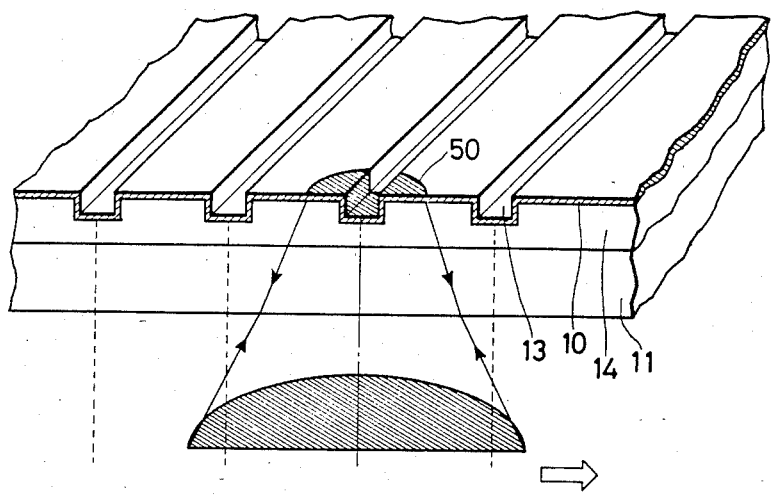
FIG. 4(a), 4(b) and 4(c) are diagrams for explaining methods of detecting signals at the time of passage through a track.
Figure 4B:
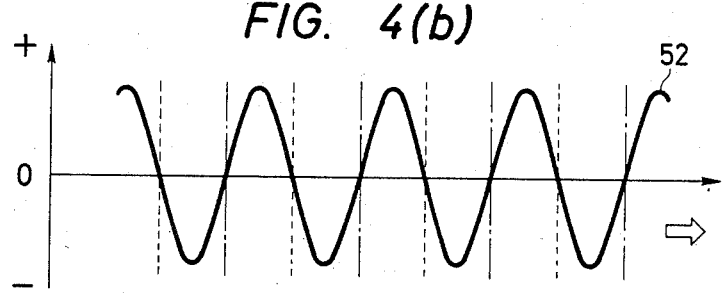
Figure 4C:
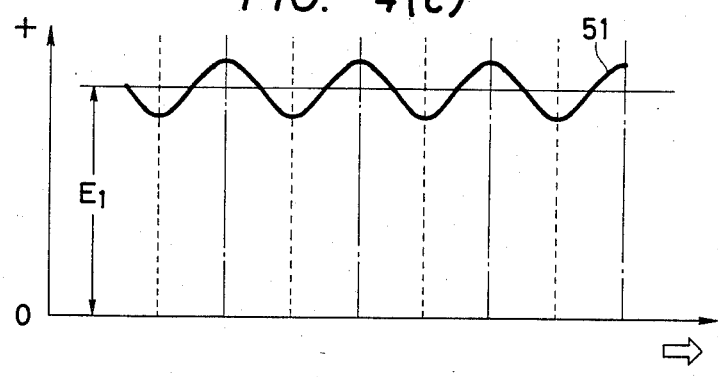

First, there will be described a method of exactly detecting the position of an optical head from a signal indicating the total quantity of reflected light and a tracking signal. FIGS. 4(a), 4(b) and 4(c) are explanatory diagrams of methods of producing signals expressive of the direction in which the optical head passes through a track, and the passage through the track, in order to exactly detect the position of the optical head from a disc. Referring to FIG. 4(a), light rays emergent from the light source of the optical head are condensed by an objective (not shown), to form a spot 50 on a metal film 10 through a substrate 11 of the disc and a UV resin 14 forming guide grooves (tracks) 13. At this time, assuming that the N.A. (numerical aperture) of the objective is 0.50 and that the wavelength of the light source is 830 nm, a spot size (a diameter at which an intensity of $1/e2$ is established) becomes about 1.6 μm. It is assumed that the pitches of the guide grooves made on the disc are 1.6 μm. Then, as the spot moves radially of the disc in the direction of an arrow, a tracking signal 52 expressing the deviation between the center line of the guide groove and the center of the spot varies as shown in FIG. 4(b). Regarding the production of this signal, there are a method employing two spots as disclosed in Japanese Laid-open Patent Application No. 49-50954, a method of spot wobble as disclosed in Japanese Laid-open Patent Application No. 49-94304, a method of track wobble as disclosed in Japanese Laid-open Patent Application No. 50-68413, a method employing diffracted light as disclosed in Japanese Laid-open Patent Application No. 49-60702, etc. In addition, when the spot moves in the direction of the arrow, the total quantity of reflected light from the disc varies as shown in FIG. 4(c). The total quantity of reflected light becomes the smallest at the center line of the guide groove, and becomes the largest at the middle line between the adjacent guide grooves. A signal 51, which is obtained by detecting the total quantity of reflected light and converting it into an electric signal by means of a photodetector, so relates to the tracking signal 52 as to be equal in period and shafted by 90° in phase. The tracking signal 52 becomes null at the center line of the guide groove, and its sign differs depending upon whether the light spot lies on the right side or the left side of the guide groove (corresponding to the outer peripheral side or the inner peripheral side of the disc). By utilizing this feature, the direction in which the guide groove is passed can be determined.

The "total quantity of reflected light" mentioned here denotes the total quantity of light which has passed and arrived through the aperture of a lens having a certain specified numerical aperture, when the reflected light from the disc has been condensed by the lens. This sort of light quantity is used for detecting an information signal recorded on the disc. The information signal is obtained in such a way that a light beam arriving through the lens aperture is condensed on the light receiving face of a single photodetector and is converted into a photocurrent, that the light beam is projected on a group of photodetectors having a plurality of light receiving faces, photocurrents from the respective photodetectors being summed, or that the photocurrents are converted into voltages, which are added up. The resulting signal can be used as the aforementioned signal 51 of the total quantity of reflected light.

There will now be stated a method of executing exact positional detection by the use of the tracking signal 52 and the total reflected-light quantity signal 51.

Waveform (a) in FIG. 5 shows the A.C. component of the total reflected-light quantity signal. Waveform (b) in the figure shows the tracking signal. In this embodiment, letting plus (+) denote a situation where the spot lies on the inner side of the disc and minus (−) denote a situation where it lies on the outer side of the disc, the variations of the two signals versus a time axis are illustrated as to a case where the light spot has moved from the outer side toward the iner side of the disc, has stopped halfway and has moved in the opposite direction. Waveform (c) in FIG. 5 shows a track signal 90 indicating places in which guide grooves exist. This signal exploits the fact that the total quantity of reflected light decreases in the place where the guide groove exists. The signal of the total quantity of reflected light is compared with a certain voltage $E_1$, and a case where the former is smaller than the latter is caused to correspond to the state of logic level "0". Then, when the variation of the signal 90 is observed on the time axis, the fall of the waveform corresponds substantially to that edge of the guide groove at which the spot begins to traverse this guide groove. Therefore, pulses 92 of small time width ((e) in FIG. 5) are prepared from the falls. On the other hand, in order to know the direction in which the spot passes through the guide groove, a signal (called "track sign signal") 91 ((d) in FIG. 5) is prepared by comparing the tracking signal 52 with the zero level. The direction of the passage through the guide groove can be determined by comparing the track sign signal 91 with the timing of the track passage edge signal 92. Accordingly, when it is desired to know the number of the guide grooves through which the light spot has passed when moving from the outer side toward the inner side, the number of pulses of a track passage edge signal 53 ((g) in FIG. 5) at the time at which the tracking signal 52 becomes minus, that is, at which the track sign signal 91 becomes a low level, may be counted. The same applies to the movement in the opposite direction. An example of a practicable circuit for realizing the operations described above is shown in FIG. 6. The total reflected-light quantity signal 51 is applied to the (+) terminal of a comparator 93a, and the voltage $E_1$ is applied to the (−) terminal thereof, thereby to make the comparison between the total reflected-light quantity signal 51 and the voltage $E_1$. An output logic level becomes "1" when the level of the signal 51 is greater than $E_1$, and it becomes "0" in the other case. The output signal 90 is applied to a monostable multivibrator 94 so as to form the pulses of fixed width from the falls of the signal 90. This output signal 92 is applied to one terminal of each of AND circuits 95a and 95b for taking logical products. The remaining terminals of the AND circuits 95a and 95b are respectively supplied with the sign signal 91 obtained by applying the tracking signal 52 to a comparator 93b, and a signal obtained by inverting the sign signal 91 by means of an inverter circuit 96. The respective AND circuits 95b and 95a deliver a plus direction edge signal 54 ((f) in FIG. 5) which generates a pulse each time the light spot passes through the track from the inner side to the outer side, and the minus direction edge signal 53 which generates the pulse each time the light spot passes through the track from the outer side to the inner side. Thus, using these signals, it is possible to know the number of remaining tracks up to a target track being accessed, which number is required for a speed control. In the circuit of FIG. 6, an access sign signal 56 indicating the direction of the access is caused to correspond to, for example, the logic level "0" in case of accessing the target track from the outer side toward the inner side. Then, a logic circuit consisting of logic elements 97, 98, 99, 100, 101, 102 and 103 selects the plus direction edge signal 54 and applies it to the Up terminal of a counter 104, and it selects the minus direction edge signal 53 and applies it to the Down terminal of the counter 104. At the start of the access, the counter 104 is loaded with the absolute value 55 of a difference up to the target guide groove located on the inner side. When the light spot has started moving from the outer side toward the inner side, the pulse appears in the minus direction edge signal 53 and decreases the content of the counter 104 each time the light spot traverses on guide groove from the outer side toward the inner side. On the other hand, when the light spot comes back halfway for any reason and traverses one guide groove from the inner side toward the outer side, the pulse appears in the plus direction edge signal 54 and increases the content of the counter 104. Thus, the counter 104 delivers the exact absolute value 57 of the remaining guide grooves in the access operation. When the content of the counter 104 has become zero, a pulse A which indicates this fact is provided from the BR terminal of the counter 104. From this pulse A, it can be known that the light spot has reached the edge of the target guide groove.

Using the plus and minus direction edge signals 54 and 53, the absolute value of a speed in the access operation, the value being required for the speed control, can be determined. By way of example, in a circuit of FIG. 7, the minus direction edge signal 53 is applied to a frequency-to-voltage converter 105, while the plus direction edge signal 54 is applied to a frequency-to-voltage converter 106. Letting p denote the pitch of the guide grooves and v denote the absolute value of the speed of the passage through the guide groove, the frequency f of a train of pulses each of which appears at the edge of the guide groove at the passage through this guide groove is given by the following expression:

$$f = v/p$$

By knowing this frequency, accordingly, the absolute value of the speed at which the light spot passes through the guide groove can be determined. The direction of the passage can be determined from the existence of the pulse of the edge signal 53 or 54. The circuit of FIG. 7 is a practicable example for performing the operations. The output of the frequency-to-voltage converter (hereinbelow, termed "F/V converter") 105 or 106 is such that, in correspondence with the sign of passage through each track, the speed of the passage through the track is converted into the analog value in the form of a voltage, this form being convenient for the later speed comparison. The outputs of the F/V converters 105 and 107 have their difference taken by a differential amplifier 106, the output of which is applied to both the input of an inverter circuit 108 and a switching circuit 109. The output of the inverter circuit 108 is applied to a switching circuit 110, which is controlled by the inverted signal of the control 56 for controlling the switching circuit 109. The outputs of the switching circuits 109 and 110 are combined to form a signal 111 expressive of the absolute value of the speed. More specifically, as regards the access sign signal 56, the access from the inner side toward the outer side is now caused to correspond to logic level "1". In case of the access from the inner side to the outer side, therefore, the F/V conversion output of the plus direction edge signal 54 brings the differential output into the + sign. Then, since the access sign signal is "1", the switching circuit 109 turns ON, and this appears as the absolute value signal 111 of the speed. Conversely, in case of access from the outer side to the inner side, the access sign signal 56 is "0" in terms of the logic level. Therefore, the switching circuit 110 is turned ON by the output of an inverter 112 for inverting the access sign signal 56. Besides, the F/V conversion output of the minus direction edge signal 53 brings the output of the differential amplifier 107 into the − sign, but the latter is rendered the + sign by the inverter circuit 108. This appears as the absolute value signal 111 of the speed.

Figure 9:
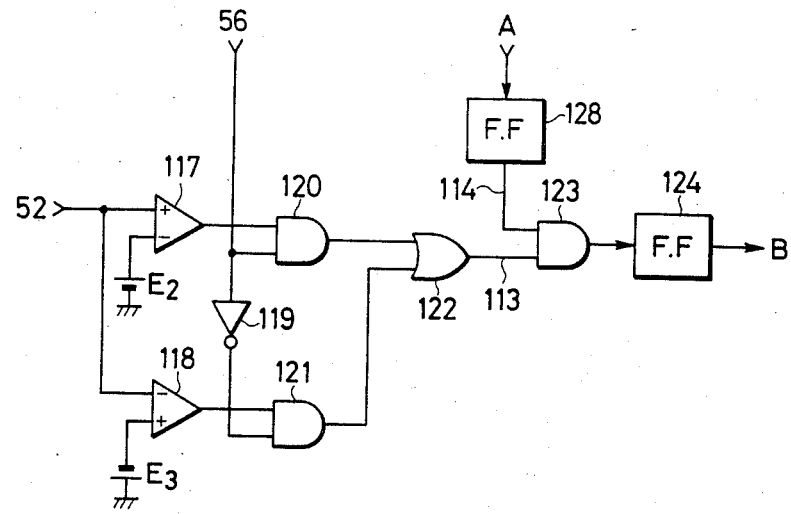
FIGS. 9 and 10 are circuit block diagrams for explaining the positional control.
Figure 10:
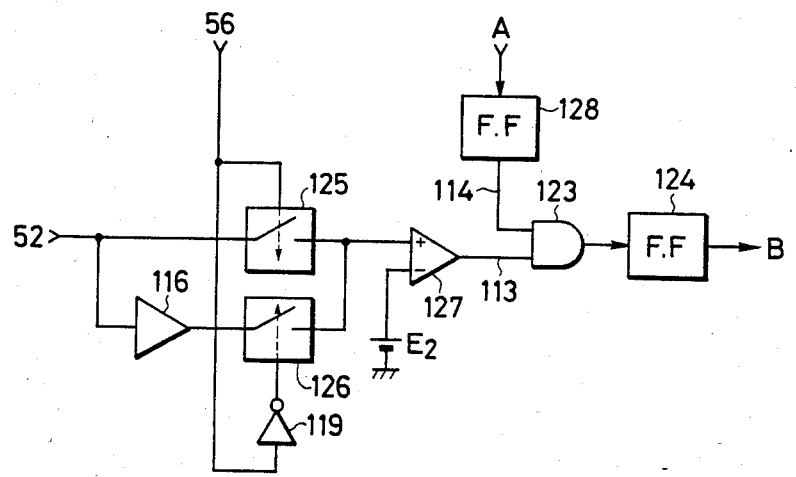

Now, the procedure of preparing a timing signal for chainging-over the speed control to the positional control will be described with reference to FIG. 8. The servo system of the positional control is usually designed on the assumption of the performance of a linear operation. This comes from an easy analysis and a simple circuit arrangement. As shown in FIG. 4(b), however, the tracking error signal 52 varies sinusoidally as a function of the track position and exhibits a nonlinear characteristic as a control input. In such system, the timing at which the operation of the servo system is started becomes an important factor for the stable operation of the system. Referring to (a) of FIG. 8, when the spot has traversed the disc from the inner side to the outer side thereof, to come close to the N-th target guide groove, the tracking error signal 52 varies as illustrated. When the tracking error signal is expressed as a sinusoidal wave whose origin is a target point 115 (the zero point of the tracking error signal), the timing (of the start of the positional control) for executing the stable operation extends, according to experiments, between the peak points of the + and − signs closest to the target point (within $\pm \pi/2$ in terms of the phase of the sinusoidal wave). More suitable is a linear region whose point of symmetry is the origin. In addition, the servo system needs to be operated at an edge part before the passage through the zero point of the target guide groove. With the above taken into consideration, when the spot approaches the target guide groove from the inner side toward the outer side of the disc, the positional servo system may be turned ON after the spot has passed through the zero point of guide groove directly preceding to the target guide groove and has passed through the next plus peak point. Conversely, when the spot approaches the target guide groove from the outer side toward the inner side of the disc, the positional servo system is turned ON after the spot has passed through the zero point of the guide groove directly preceding to the target guide groove and has passed through the next minus peak point. Circuits for realizing the above are shown in FIGS. 9 and 10. Waveform (a), (b), (c) and (g) in FIG. 8 show the tracking error signal 52 at the time at which the spot has approached the target guide groove from the inner side toward the outer side of the disc, a signal 113 indicating linear regions, a signal B indicating the turn-ON of the positional servo system, and a signal 144 indicating the arrival at the target guide groove, respectively. Referring to FIG. 9, the tracking error signal 52 is applied to the + terminal of a comparator 117, the − terminal of which is supplied with a voltage $E_2$. As indicated in (a) of FIG. 8, the level of the voltage $E_2$ is set at a positive level which is substantially linear to the target point 115 of the tracking error signal 52. The output of the comparator 117 is applied to one input terminal of an AND circuit 120, the other input terminal of which is supplied with the access polarity signal 56. The tracking error signal 52 is also applied to the − terminal of a comparator 118, the + terminal of which is supplied with a voltage $E_3$. As indicated in (a) of FIG. 8, the level of the voltage $E_3$ is set at a negative level which is substantially linear to the target point 115 of the tracking error signal 52. The output of the comparator 118 is applied to one input of an AND circuit 121, the other input of which is supplied with a signal obtained by inverting the access sign signal 56 by means of an inverter 119. The outputs of the AND circuits 121 and 120 are applied to an OR circuit 122 which takes the logical sum thereof. Thus, the output 113 of the OR circuit 122 becomes the waveform as shown in (b) of FIG. 8, when the access sign signal 56 is "1", and it becomes a waveform as shown in (e) of FIG. 8, when the access sign signal 56 is "0". In both the cases, the fall of a pulsative signal represents the end of the linear region whose center is the target point. In order to perform the positional control of the light spot to the target point 115 of the target guide groove, the linear region of the target guide groove needs to be known. Therefore, the BR output (the signal provided when the counter content 57 has become zero) A of the counter 104, which has been explained with reference to FIG. 6, is used. As explained with reference to (f) and (g) of FIG. 5, the pulses 54 and 53 indicative of the passage through the guide grooves develop at those edge parts of the guide grooves to-be-passed which appear in time precedence. Accordingly, the rise parts of the pulses correspond substantially to the peak points of the tracking error signal. Supposing that the signal A is a pulse signal which rises when the content of the counter 104 has become zero, it is applied to a flip-flop 128 so as to prepare the signal 114 which rises at the rise of the signal A. The signal 114 is applied to one input of an AND circuit 123, and the signal 113 is applied to the other input thereof, whereby the linear region of the target guide groove is selected by the signal 114. The output of the AND circuit 123 is applied to a trailing edge reaction type (master-slave type) flip-flop 124, to generate a positional control start signal B which rises at the trailing edge of the applied input. The signal B can also be formed by the circuit shown in FIG. 10. The tracking error signal 52 is applied to a switching circuit 125, while it is applied to and inverted by an inverting amplifier 116, the inverted signal entering a switching circuit 126. The switching circuit 125 is controlled by the access sign signal 56, and the switching circuit 126 is controlled by a signal obtained by inverting the access sign signal 56 by means of an inverter 119. The outputs of the switching circuits 125 and 126 are combined and then applied to the + terminal of a comparator 127. The voltage $E_2$ is applied to the − terminal of the comparator 127. Thus, the signal 113 in which the fall of the comparator output represents the end of the linear region having the target point as its center is generated. The subsequent processing is the same as the operations in FIG. 9. In this case, the positive peak level and the negative peak level of the tracking error signal 52 must be substantially equal. The circuit of FIG. 10 corresponds to a case of processing the first half portion of the circuit of FIG. 9 analogously.

Figure 1:
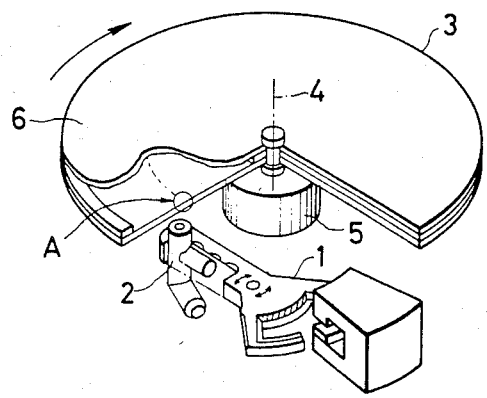
FIG. 1 is a schematic arrangement view of an optical memory apparatus.
Figure 2:
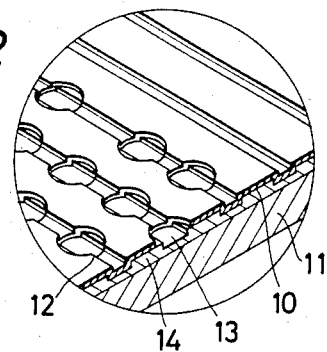
FIG. 2 is a partially enlarged sectional view of a disc.
Figure 3:
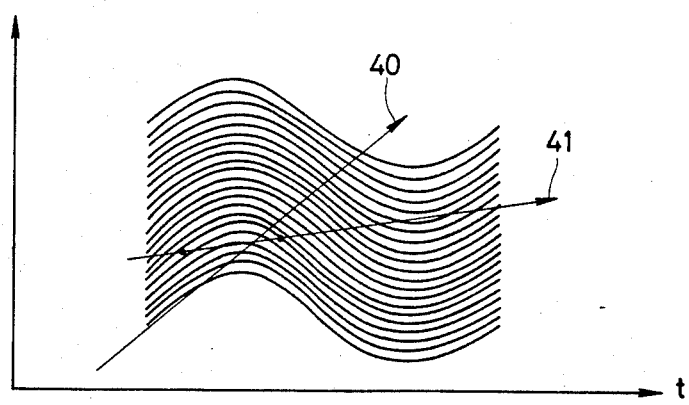
FIG. 3 is a diagram for explaining the relationships between light spot traces and eccentricity.

A general system for performing the access operation by adopting the present invention thus far stated, will be described with reference to FIG. 11. In the present embodiment, the seek control and the follow-up control are carried out by a single actuator, and an optical head to be placed on the actuator is made light in weight and small in size. Regarding the construction, by way of example, the optical head can be placed on the arm portion of the swing arm explained with reference to FIG. 1.

The quantity of reflected light detected by the optical head 2 is subjected to photoelectric conversion by a photodetector (not shown), and the resulting electric signal is applied to a tracking error signal generator circuit 201 and a total reflected-light quantity signal generator circuit 200. Here, the method of preparing the tracking error signal will not be described in detail. The tracking error signal 52 is obtained from the tracking error signal generator circuit 201, while the total reflected-light quantity signal 51 is obtained from the total reflected-light quantity signal generator circuit 200. The tracking error signal 52 and the total reflected-light quantity signal 51 are applied to an edge signal generator circuit 202, which generates the plus direction edge signal 54 and the minus direction edge signal 53, and they are operated and processed therein. The arrangement of the edge signal generator circuit 202 has been described in detail in conjunction with FIG. 6. The plus and minus direction edge signals 54 and 53 are applied to both a differential counter 203 for calculating the difference up to the target guide groove and a velocity detecting circuit 204, which deliver the absolute value signal 57 of the difference up to the target guide groove and the absolute value signal 111 of the velocity respectively. Regarding these, the arrangement and operations of the differential counter 203 have been described in detail with reference to FIG. 6, while the arrangement and operations of the velocity detecting circuit 204 have been described in detail with reference to FIG. 7. The absolute value signal 57 of the difference up to the target guide groove is applied to a target velicity curve generator circuit 205. The target velocity curve generator circuit 205 delivers the optimum velocity in accordance with the difference up to the target guide groove. Ordinarily, the optimum velocity is recommended to be proportional to the square root of the difference. Here, since the output of the counter 104 is given in digital form, a table of square roots is stored in a ROM beforehand, and a target velocity signal 206 is delivered digitally in accordance with the absolute value signal 57 of the difference up to the target guide groove. The target velocity signal 206 is applied to a D/A (digital-to-analog) converter 207 and is converted into an analog quantity, which is applied to one input of a differential amplifier 208. The other input thereof receives the absolute value signal 111 of the velocity from the velocity detecting circuit 204, so that the difference is taken. The output of the difference is applied to a sign inversion circuit 209. Since the output of the difference of the velocity is an absolute value, the sign inversion circuit 209 performs the operation of affording a sign to the velocity difference in correspondence with the logic level of the access sign signal 56. Accordingly, the output of this circuit becomes the difference between the target velocity and the actual velocity and having the sign. This difference enters a seek control/positional control switching circuit 210, which is controlled by the timing signal B for the start of the positional control. More specifically, when the timing signal B is LOW, the seek control is established, and the signal of the velocity difference appears at the output of the switching circuit 210 and drives the swing arm 1 through a swing arm driver circuit 251. Then the seek control has ended with the light spot arriving at the target guide groove, the timing signal B becomes HIGH to switch the control to the positional control. Regarding the flow of signals for the positional control, the tracking error signal 52 is applied to a switching circuit 211, which is coupled to a phase compensator circuit 212 under the control of the timing signal B or when this timing signal is "high". The output of the phase compensator circuit is applied to an adder circuit 213 along with a jump signal D to be described later, and the applied signals are added therein, the sum being applied to the switching circuit 210. In this manner, the positional control is started by the timing signal B, and the light spot can be stably introduced to the target guide groove.

The tracking error signal 52 is also applied to a timing signal generator circuit 214 for producing the timing signal B, along with the access sign signal 56 and the signal A. The arrangement and operations of the circuit 214 have been described in detail with reference to FIGS. 9 and 10.

The target guide groove is tracked by the above operations, and address information stored in the guide groove is read out. Reading means therefor is omitted in the present embodiment. The read-out information is transmitted to a controller (not shown), to decide whether or not the particular guide groove is the target guide groove.

The controller mentioned here is a control unit which controls the whole optical disc apparatus. Usually, it gives instructions or commands to the driving unit (having been described in detail in the present invention) which includes the driving mechanism and the driving circuitry required, at the least, for reading and writing data, and it controls the driving unit in order to read or write data. As the function of this sort, the address of a desired guide groove from a computer connected with the controller is received in an access operation, it is compared with the address of a guide groove read out currently, the absolute value and sign of the difference of the current guide groove up to the desired guide groove are calculated, and the result is transmitted to the driving unit. The driving unit executes the seek control and the positional control by itself, and begins to read data from the target guide groove or a guide groove close thereto. Then, the controller decodes the data to know the address of the guide groove currently read out and to judge the subsequent access procedure. By way of example, when the read-out guide groove is the target guide groove, the controller transmits as a jump number signal 58, a signal indicative of one guide groove, and a jump sign signal indicative of the direction of jump from the outer side to the inner side of the disc, on the assumption that guide grooves on the disc are recorded spirally from the inner side to the outer side. The jump number signal 58 is applied to a jump counter 215. The jump counter 215 transmits the sign signal of the jump to a jump signal generator 216, and generates pulses for starting the jump by the number of guide grooves to be jumped, at specified time intervals. Upon receiving the pulses, the jump signal generator 216 produces the driving signal D for executing the jump in accordance with the jump sign signal. The details of the jump operation are contained in 'Philips Technical Review', vol. 33, p. 178, and are omitted here.

Accordingly, in order to steadily read out the target guide groove upon reaching it, the jump number signal 58 is transmitted from the controller in the manner including the signal indicative of one guide groove to be jumped and the jump sign signal indicative of the direction of the jump from the outer side to the inner side, each time the disc executes one revolution. In a case where, when the address content recorded in the guide groove to which the light spot has been positionally controlled at the end of the access is read out, this guide groove differs from the target guide groove, the light spot is moved to the target guide groove by performing the jump, subject to the condition that the difference between the guide groove currently read out and the target guide groove is smaller than a certain set number (for example, 64 or 128). At this time, the controller transmits the jump number signal 58 which contains the number of guide grooves up to the target guide groove and the direction of the jump. If the difference between the current guide groove and the target guide groove is greater than the certain set value, an access operation including the speed control will be started. This operation is the repetition of the access procedure thus far explained.

As described above, according to the present embodiment, whether the light spot passes through the guide groove on the disc from the outer side to the inner side or from the inner side to the outer side is known from the total reflected-light quantity signal and the tracking error signal, which are generated when the light spot passes through the guide groove. Thus, the position of the optical head can be exactly detected without errors attributed to an eccentricity, mechanical vibrations, etc. The aforementioned signals at the passage of the light spot through the guide groove are also utilized for the velocity detection, whereby the relative velocity between the light spot and the guide groove can be exactly detected. Further, according to the present embodiment, even when the swing arm is used as the actuator, the positioning operation is possible from the rough positioning over the full radius of the disc to the fine positioning of about 0.1 μm.

In the next place, another embodiment of the present invention will be described with reference to FIG. 12. In the foregoing embodiment of FIG. 11, both the rough positioning over the full radius of the disc and the fine positioning are executed by the single actuator. With the actuator of the specified type, however, the frequency characteristic of the displacement versus the driving current becomes problematic, and the cutoff frequency cannot be made high when the servo system for the positional control is constructed. It is accordingly desirable to dispose separately from a first actuator for rough positioning, a second actuator which can move in only a minute range, but has a good frequency responsibility enough to make the cutoff frequency high even when the servo system is constructed. In this case, how the two actuators are interlocked during an access operation becomes a problem. It is the present embodiment that affords an expedient for solving the problem.

Here, a linear motor 314 will be exemplified as the first actuator for the rough positioning. The purport of the present invention applies also to other actuators. On the other hand, a galvano-mirror 308 or a pivot mirror is employed as the second actuator of high responsibility for the follow-up control within the minute range. The disc 3 is rotating in a predetermined direction about the rotary shaft 4. An optical head 2' is placed on a movable bed 315, which moves on a base 309 as rollers 310 rotate. The movable bed 315 is coupled to a coil 311 through a supporting mechanism 313, and it is driven by the electromagnetic forces of a magnet 312 and current flowing though the coil 311. The optical head 2' includes therein an objective 306 which serves to form the light spot on the disc, the galvano-mirror 308 which is means for deflecting the light spot on the surface of the disc, a photodetector 307 which receives reflected light from the disc surface, a light source, an optical system which leads a light beam from the light source to the objective, and an optical system which leads the reflected light to the photodetector. Since the light source and the optical systems are unnecessary for explaining the present invention, they are not illustrated.

The purpose in which the total reflected-light quantity signal 51 and the tracking signal 52 are produced from the output of the photodetector 307, whereupon the signals 53 and 54 indicating the directions of passage through guide grooves are produced, and the process in which the velocity control is performed by the use of these signals, have been described in detail in the foregoing embodiment. Therefore, the same blocks are merely indicated and are not explained repeatedly. The block 214 for producing the timing signal B of the positional control from the tracking error signal 52, and the portion for effecting the jump function are not explained, either, because they are the same. Only the procedure of the positional control will be explained. The switching circuit 211 is turned "on" by the timing signal B of the positional control, and it leads the tracking error signal 52 to the phase compensator 212 so as to subject the signal to the phase compensation of enhancing the stability and follow-up performance of the control system. After the compensated signal has been added to the jump signal D by the adder circuit 213, it becomes a mirror driving signal E. The mirror driving signal E drives the galvano-mirror 308 through a galvano-mirror driver circuit 305, so as to cause the light spot to track a guide groove. In this state, there is not a target signal for a position to which the first actuator is positioned, and hence, the positioning signal needs to be prepared.

Figure 13:
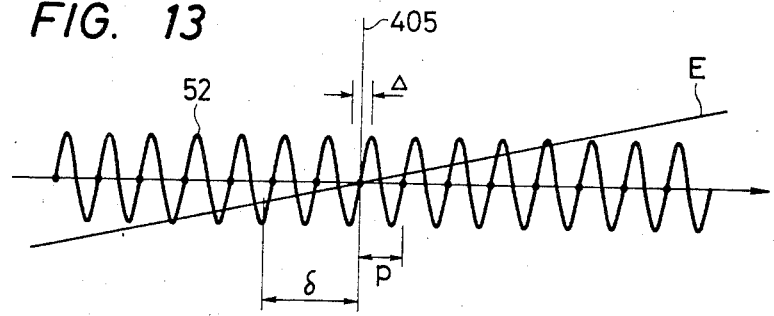
FIGS. 13 and 14 are diagrams for explaining the operation of the embodiment in FIG. 12.
Figure 14:
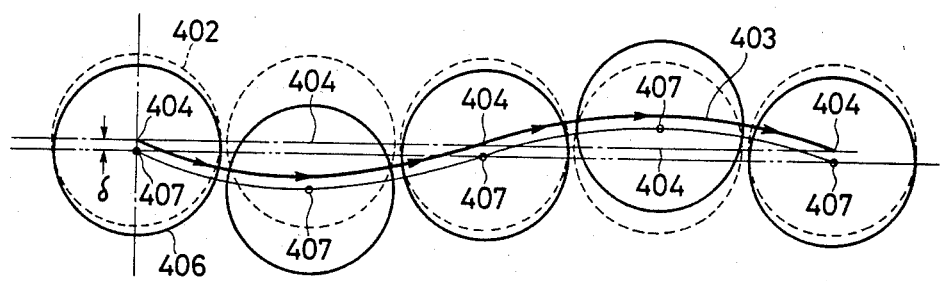

Here, the positioning signal will be described. When the linear motor moves radially on the disc surface under the condition that the light spot is fixed at the center of the field of view of the objective to be stated later, the tracking error signal 52 varies versus the magnitude of the movement as illustrated in FIG. 13. It is also considered to use this tracking signal 52 as the positioning signal for the linear motor. Since, however, the linear range Δ of this signal is only to the extent of the width of the guide groove, the control will be impossible unless the follow-up precision δ falls within this range. With conventional linear motors, the follow-up precision amounts to 2–3 μm and even to about 10 μm when it is great. However, the pitch p of guide grooves in the optical disc is about 1.6 μm to the end of recording information at high density, and the width Δ of the guide groove becomes about 0.8–0.6 μm. It is accordingly impossible to perform the positioning control of the linear motor by using the tracking error signal 52 and with the center line 405 of the guide groove as a target. It is therefore necessary to prepare a signal which expresses the deviation between the target guide groove being tracked and the linear motor and whose linear region is wider than the linear region of the tracking error signal, and to perform the positioning of the linear motor by the use of this signal. As such signal, there is the trace of the light spot followed up by the galvano-mirror. More specifically, each circular region indicated by a dotted line in FIG. 14 is the field of view 402 of the objective, and a trace 403 is the trace versus the time t, of the guide groove being tracked by the galvano-mirror. The guide groove being followed up within the lens view field 402 varies sinusoidally versus the time due to an eccentricity, as illustrated in the figure. Since the objective is fixed to the movable bed of the linear motor, the center 404 of the lens view field 402 moves unitarily with the linear motor. The neutral point of the galvano-mirror (determined when the mirror has been mechanically set on the movable bed of the linear motor) is uniquely determined owing to the spring supporting mechanism when the driving signal E is null. Usually, adjustments are so made that when the galvano-mirror lies at the neutral point, the light spot is situated at the center 404 of the objective view field 402. The reason for such adjustments is that the residual aberration of the lens is the least at the center of the lens view field. Between the movement value of the light spot within the lens view field and the angle of rotation of the galvano-mirror, there is a certain linear relationship which is determined by an optical arrangement relation and the focal distance of the objective. Accordingly, the deviation from the center of the lens view field to the guide groove being tracked by the light spot can be determined from the rotational angle of the galvano-mirror.

The rotational angle of the galvano-mirror can be determined from the driving signal E. Although the rotational angle of the galvano-mirror has a characteristic differing in dependence upon the frequency components of the driving signal E (that is, a frequency response), the characteristic is already known. Even when, under the state under which the center of the lens view field is held in agreement with the center line 405 of the guide groove in FIG. 13 and under which the linear motor is stopped, the galvano-mirror is driven and the light spot is moved from one end to the other end of the view field of the objective, the tracking error signal 52 is detected similarly to the foregoing. The galvano-mirror driving signal E at this time becomes null at the center line 405 of the target groove, and it has the minus sign at one end of the lens view field and the plus sign at the other end. It falls into a linear relation to the light spot within the lens view field, and its linear region extends over the whole view field of the objective.

Figure 12:
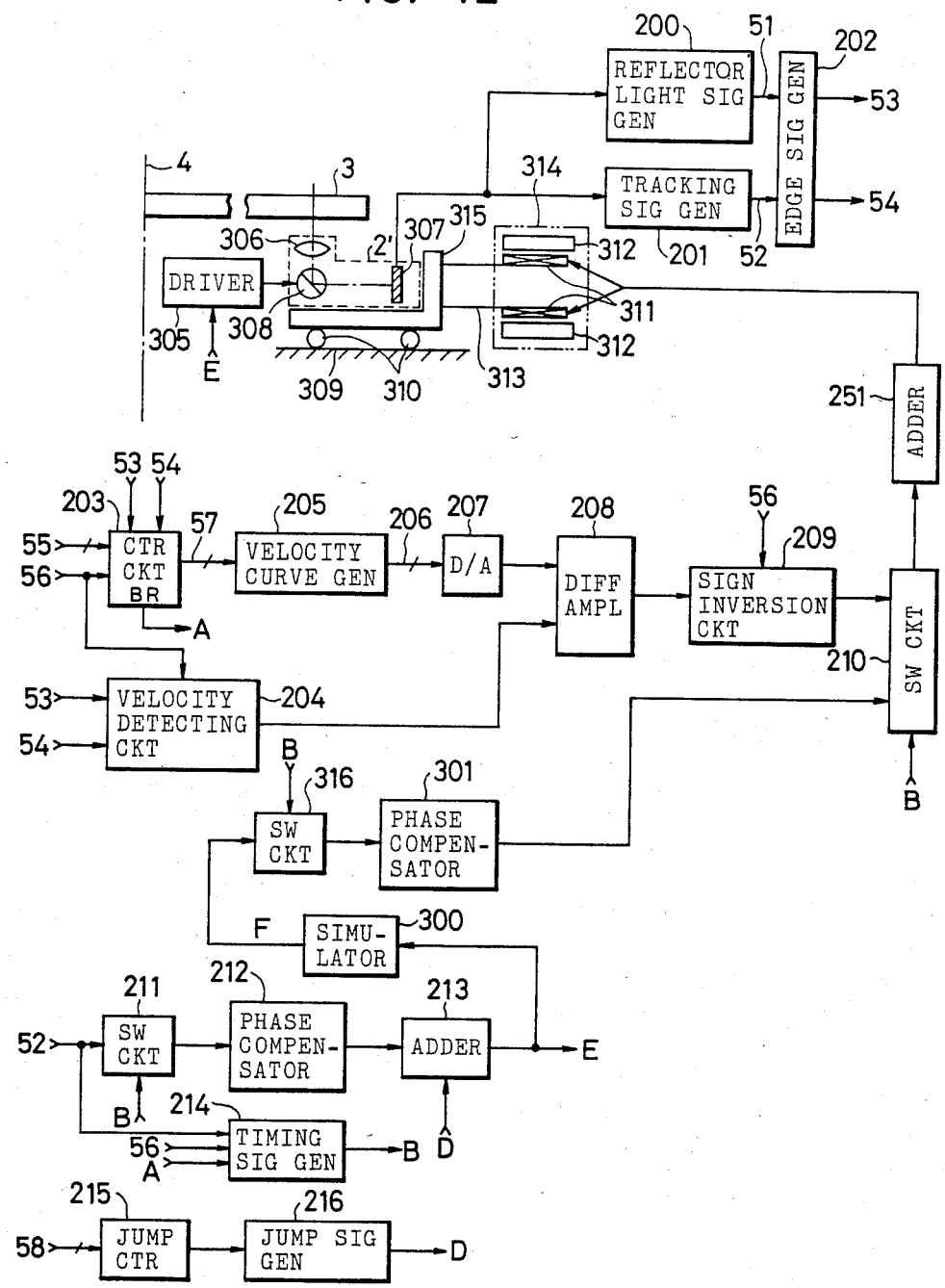
FIG. 12 is a block diagram showing another embodiment of the present invention.

In the arrangement of FIG. 12, the driving signal E is applied to a circuit 300 for simulating the frequency characteristic of the galvano-mirror, to form a signal F of the deviation of the light spot from the center of the lens view field. The signal F is passed through a phase compensator 301 via a switching circuit 316, which is turned "on" by the timing signal B of the positional control, so as to drive the linear motor. In this manner, the position of the linear motor is controlled so that the light spot may come to the center of the lens view field. Herein, the deviation signal F of the light spot from the center of the lens view field has a wide linear region, which is at least 100 μm or so. Therefore, the signal has no problem even when the follow-up precision of the linear motor amounts to 2–3 μm.

In FIG. 14, each circular region 406 of solid line is the field of view of the objective after the above operations have been performed.

More specifically, since the light spot tracks the guide groove trace 403, the positioning of the linear motor is performed upon detecting the deviation between the light spot and the center 407 of the lens view field. Therefore, the center of the lens view field (indicated by each white circle) 407 unitary with the linear motor follows up the light spot, but it deviates by the component of the aforementioned positioning error δ (explained as the follow-up precision). While the positioning error differs depending upon the characteristics of the positioning servo system of the linear motor, FIG. 14 illustrates a case of a system which has a servo band capable of following up a large eccentric component. Enhancing the band of the linear motor positioning servo system in the present invention has another effect. That is, since the linear motor is controlled so that the light spot may always come to the vicinity of the center of the view field of the objective, a region of little residual aberration becomes usable. As a result, the spot size (the diameter at which the light intensity distribution becomes $1/e^2$ of the maximum value) of the light spot becomes the smallest. Thus, in a playback operation, the amplitude of a playback signal from a recorded pit becomes large, while in a recording operation, the emission power of a light source required for forming a pit of prescribed diameter may be low. Conversely, when the spot size required for the optical disc apparatus is determined at a certain value, the aberration may be reduced at only the center of the field of view, and hence, the objective becomes smaller in the number of constituent lenses and becomes lighter in weight, smaller in size and lower in cost, as compared with that in the method in which the spot is moved within the objective view field by the use of the galvano-mirror.

Figure 15:
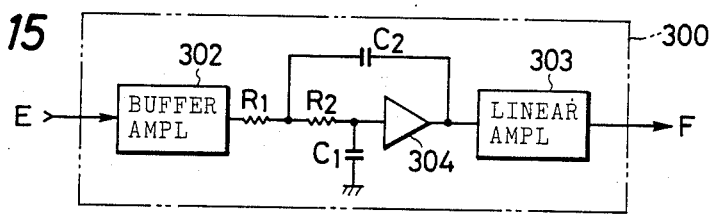
FIG. 15 is an arrangement diagram of a simulator circuit for use in the embodiment of FIG. 12.

A practicable example of the circuit 300, by which the deviation signal F of the light spot from the center of the lens view field is produced from the driving signal E, it shown in FIG. 15. The driving signal E enters a buffer amplifier 302, and is delivered to an electric circuit having a characteristic similar to the frequency characteristic of the galvano-mirror. Since the driving voltage (or current) -versus- deflection angle characteristic of a conventional galvano-mirror exhibits the characteristic of a second-order low-pass filter, this embodiment uses a second-order low-pass active filter which consists of capacitors $C_1$, $C_2$, resistors $R_1$, $R_2$ and a buffer amplifier 304. The output of this filter accordingly represents the deflection of the galvano-mirror. The deflection of the galvano-mirror and the movement of the spot on the lens view field are usually in a linear relationship. Therefore, the deviation signal F of the light spot from the lens view field is obtained by compensating the sensitivity (as to the deflection angle and the spot movement value) through a linear amplifier 303.

Figure 16:
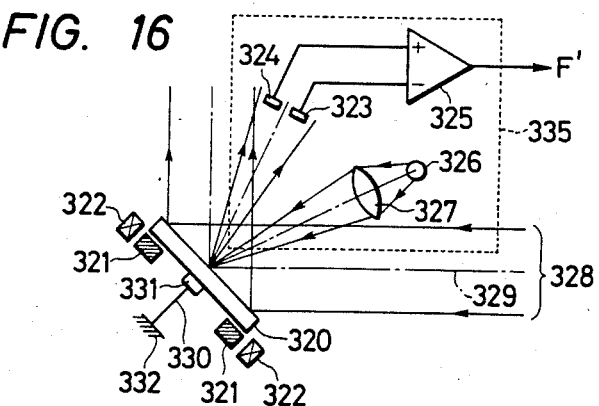
FIG. 16 is a diagram for explaining a mirror deflection detecting method for use in the present invention.
Figure 17:
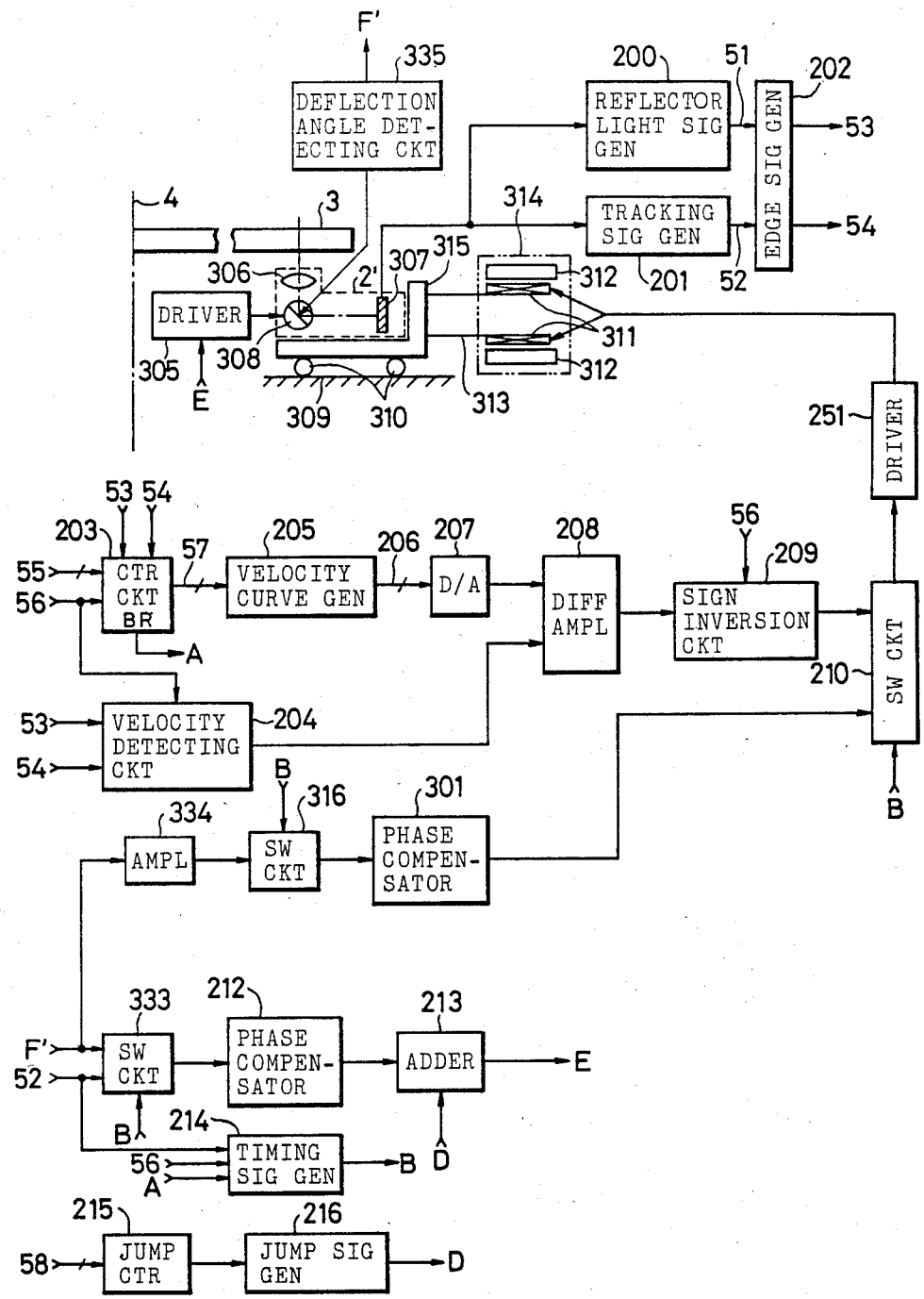
FIG. 17 is a block diagram showing still another embodiment of the present invention.

As the method of detecting the deviation signal of the light spot from the lens view field, there is a method of detecting the deflection angle of the mirror directly, otherwise than the electrical simulation from the mirror driving signal E. FIG. 16 shows a practicable example of such method. A light beam 328 emergent from a light source (not shown) enters a mirror 320 along an optical axis 329, and it is reflected in the direction of 45° so as to have its optical path curved toward an objective (not shown). A permanent magnet 321 is mounted on the rear surface of the mirror 320, and an electromagnetic force is generated by current flowing through a coil 322 surrounding the magnet, so that the mirror is rotated about a bearing 331. The bearing 331 is fixed to a part 332 of the optical head by a supporting rod 330. The bearing 331 is formed of a rubber material which is flexible. This structure is a kind of pivot mirror. In order to detect the deflection angle, a light beam from a light emitting diode 326 is condensed on the reflective surface of the mirror 320 by a lens 327, and the resulting reflected light beam is received by two photodetectors 323 and 324. The optical axis 329 of the light beam reflected by the mirror 320 is aligned so as to agree with the optical axis of the objective in the state in which the driving voltage is null. Thereafter, the light beam from the light emitting diode is adjusted so as to be equally received by the photodetectors 323 and 324. Then, when the outputs of the photodetectors 323 and 324 are applied to a differential amplifier 325 to take the difference of them, the output F' becomes a signal expressive of the deflection angle of the mirror. The method of directly detecting the deflection angle of the mirror in this manner makes it possible to know the movement of the mirror due to a machanical oscillation. It is therefore effective in a case where the mirror placed on the linear motor might oscillate when the linear motor performs the acceleration or attenuation of the maximum number G in the rough positioning. That is, the movement of the mirror is detected, the mirror is positioned to the first set point, and the optical axis of the objective can be prevented from fluctuating. Accordingly, the signal F' can be used for the foregoing operation when the rough positioning is being executed by the velocity control of the linear motor, and it can be used as the deviation signal from the cener of the lens view field when the mirror 320 is deflected so as to minutely position the light spot. An embodiment in which the above signal F' obtained by directly detecting the mirror deflection angle is used for access, is shown in FIG. 17.

The velocity control employing the linear motor is the same as in the embodiment thus far described, and portions represented by the same block Nos. are common and will not be explained repeatedly. Since the timing signal B of the positional control is "low" in the velocity control, a switching circuit 333 allows the mirror deflection signal F' to pass therethrough during this period only, and it controls so as to prevent the deflection mirror 320 from oscillating mechanically and to keep it staying at the set point. When the timing signal B of the positional control has become "high", the tracking error signal 52 is allowed to pass, and the tracking of the light spot by the mirror is performed. On the other hand, the mirror deflection signal F' is applied to the switching circuit 316 through an amplifier 334 for sensitivity compensation. Only when the timing signal B of the positional control is "high", the signal passes through the switching circuit and drives the linear motor to perform the control so that the guide groove being tracked by the mirror may lie at the center of the lens view field.

As described above, by combining the first actuator which can conduct the rough positioning but which is inferior in the follow-up precision and the second actuator which has only the minute movable range but which is of high response rate and can be made high in the follow-up precision, the present embodiment makes it possible to realize the access which has a high response rate and a high follow-up precision as a whole.

In the next place, by referring to FIG. 18, there will be explained an embodiment wherein an optical head is provided with a scale, by means of which the accurate position of an actuator is detected so as to perform rough positioning, whereupon fine positioning is performed by the use of a tracking signal.

Figure 11:
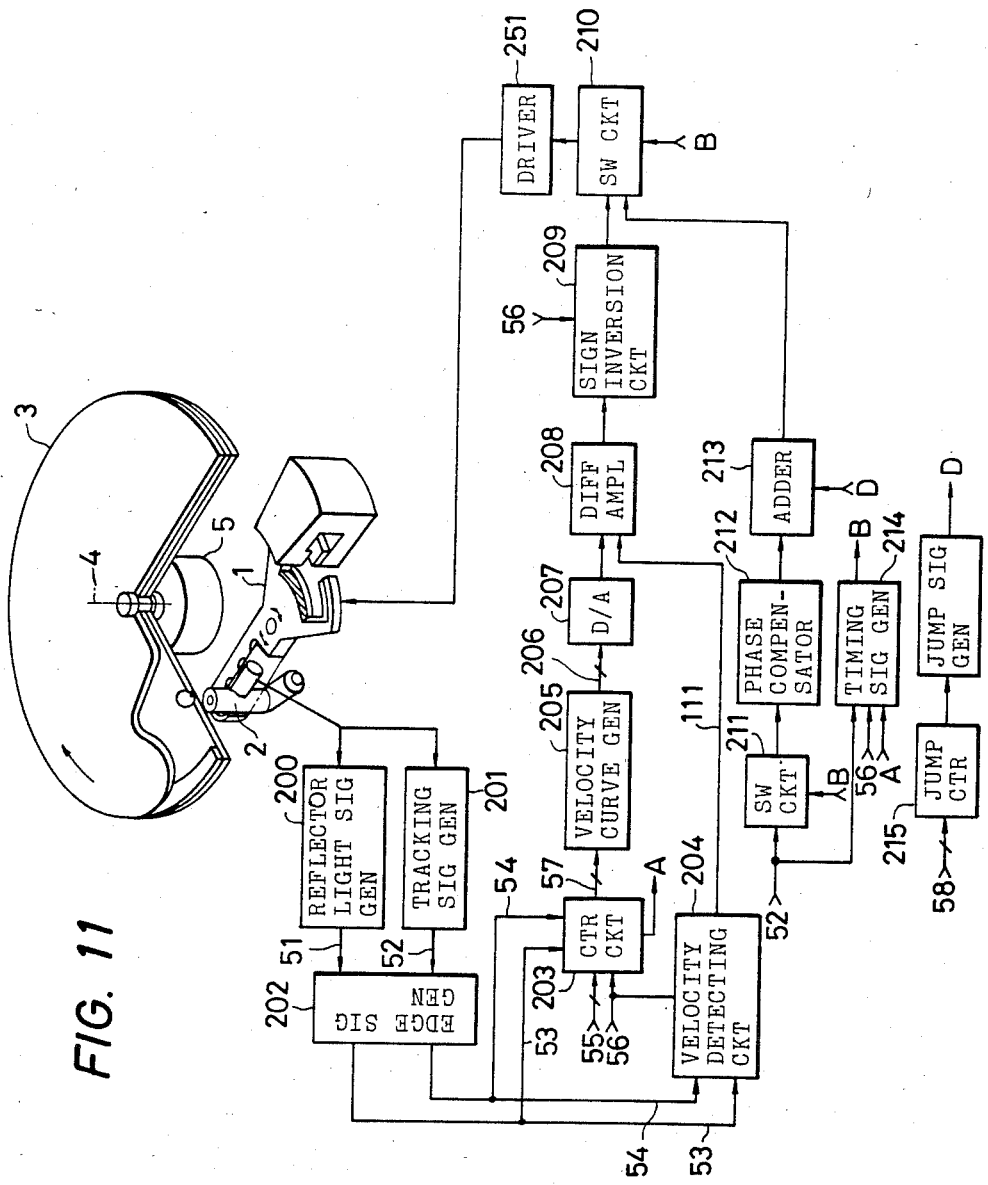
FIG. 11 is a block diagram showing an embodiment of the present invention.

In the present embodiment, the seek control and the follow-up control are executed with a single actuator, and a swing arm is used as in the embodiment of FIG. 11.

The present embodiment is characterized in that the scale for detecting the rotational angle of the swing arm is disposed outside. As the scale, a scale utilizing moire or a magnetic scale can be used by way of example. Here, the use of the moire scale will be exemplified.

Figure 18:
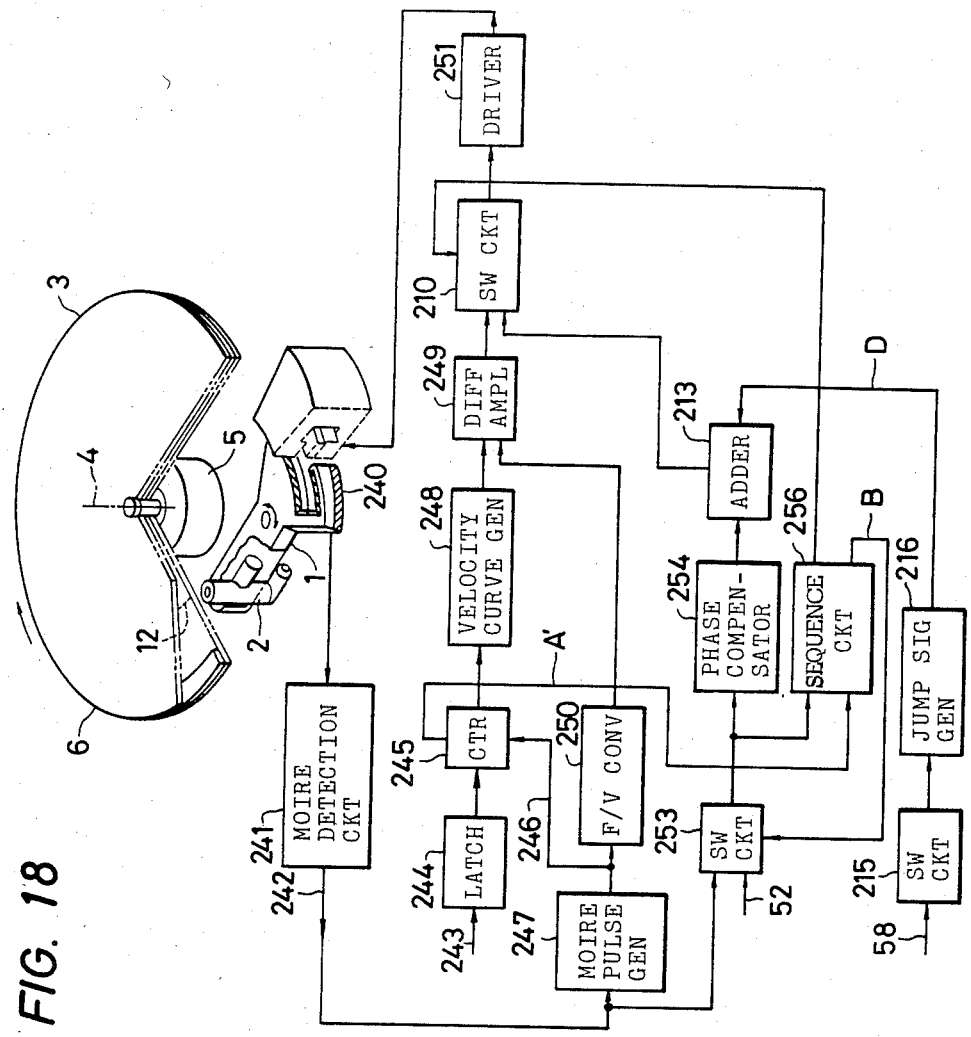
FIG. 18 is a block diagram showing a further embodiment of the present invention.

As shown in FIG. 18, the moire scale 240 is mounted on the driving part of the swing arm 1, and a positional signal based on the moire (hereinbelow, termed "moire signal") 242 (illustrated at (b) in FIG. 19) is transmitted from a moire detector circuit 241. The pitch of the moire scale which can be fabricated at the present time is very rough in comparison with the pitch of the guide grooves. For example, it is about 10 $\mu$m at the minimum and is about 50 $\mu$m typically.

There will now be described the process of access from the guide groove currently being read by the optical head, to a desired target guide groove. The difference between the current guide groove and the target guide groove is calculated by a superior control unit (not shown), to obtain a signal 243 which indicates the number of moire pitches corresponding to the guide groove difference and also the direction of the difference. This signal 243 is introduced into the present apparatus by a latch circuit 244, and is set in a down counter 245. The other input of the down counter 245 is supplied with a moire pulse 246 to be described later, and the set value of the down counter 245 is subtracted by the pulse. The moire pulse 246 is prepared in such a way that the moire signal 242 is applied to a moire pulse generator 247, which generates one pulse at each moire pitch.

The output of the down counter 245 represents the number of remaining moire pitches up to a moire position near the target guide groove, and it is applied to a velocity curve generator 248, which generates the optimum velocity signal for the seek control. This optimum velocity signal is applied as one input of a differential amplifier 249. The other input of the differential amplifier 249 is supplied with an actual velocity signal. While there are various expedients for detecting the actual velocity, the present embodiment detects the actual velocity by applying the moire pulses 246 to an F/V (frequency-to-voltage) converter 250. As another expedient, there is a method in which current for driving the swing arm is integrated.

The differential amplifier 249 compares the optimum velocity signal and the actual velocity signal, and provides the difference of them. This output is applied to a first switching circuit 210 for switching the seek control and the follow-up control. It effects the switching in accordance with a logic sequence to be described later, so as to drive the swing arm through a power amplifier 251.

The moire signal 242 is further applied to a second switching circuit 253. It is selected in accordance with a logic sequence to be stated later, and is applied to an adder 213 through a phase compensator 254. The other input of the adder 213 is supplied with a jump signal D (illustrated at (c) in FIG. 19) for jumping guide grooves one by one.

The output of the adder 213 is applied as the other input of the first switching circuit 210. In case of the follow-up control, it is selected and drives the swing arm through the power amplifier 251. In the state in which the follow-up control has been performed, the output of the second switching circuit 253 serves also as a signal expressive of the follow-up precison. Therefore, it is applied to a sequence circuit 256 which generates the timing of the logic sequence.

The other input of the second switching circuit 253 is supplied with the tracking signal (llustrated at (d) in FIG. 19) which expresses the deviation between the center line of the guide groove where the optical head is detected, and the central position of the light spot. The signal is used in a case where one guide groove is selectively followed up by the second switching circuit 253. Since the means for detecting the tracking signal from the reflected light of the disc has been described in detail in the foregoing embodiment, it is omitted from this figure.

In the present embodiment, in order to execute the minute positioning up to the target guide groove by the jump operation, No. of a guide groove nearby is once read after the rough positioning based on the moire, the difference up to the target guide groove is calculated by the superior control unit, and a signal 58 indicative of the difference and the direction is set in a jump counter 215. The jump counter 215 generates pulses of a certain specified period by the set number of guide grooves to-be-jumped, a jump signal generator 216 for generating the jump signal is started by the pulses, and its output D is applied to the adder 213 as described before.

Next, the operations of the present embodiment will be described with reference to the time chart of FIG. 19 and the trace diagram of the light spot in FIG. 20. When the number of moire pitches corresponding to the difference between the target guide groove and the current guide groove has been set in the latch circuit 244 as the signal 243, the swing arm starts moving along the optimum velocity curve to the zero point $x_o$ of the moire signal closest to the target guide groove at a time $t_o$. Meantime, the moire pulse generator 247 detects the moire signal 242 and applies the moire pulses 246 to the down counter 245. When the set value has become null, the down counter 245 generates a signal A', which makes known the approach to the moire closest to the target guide groove, and applies it to the sequence circuit 256.

In the sequence circuit 256, a switching signal B' (illustrated at (a) in FIG. 19) for executing positioning based on the moire signal is produced from the moire signal 242 entered through the second switching circuit 253 and the aforementioned signal A'. This switching signal is applied to the first switching circuit 210. In consideration of the stable pull-in of the servo system, the generation timing of the switching signal B' is most suitably the time at which the swing arm has rushed into a part where the moire signal is linear with respect to the zero point thereof. Owing to this timing, the trace of the light spot shown in FIG. 20 is introduced into the guide groove corresponding to the target value $x_o$ of the moire. In the figure, the half cycle of the moire pitch is denoted by $\alpha$, and the eccentric value of the disc is denoted by $\beta$. In order to know if the moire positioning has arrived within a certain precision, it may be detected that the voltage level of the moire signal 242 falls within certain set values in the sequence circuit 256. After a period of time $t_2$, the switching signal B (illustrated at (e) in FIG. 19) for executing positioning based on the tracking signal 52 is generated and is applied to the second switching circuit 253.

Then, the light spot is introduced into a guide groove 71, with which it meets, at that moment and reads out address information recorded in the guide groove. By reading out the address information, the superior control unit calculates the number of remaining guide grooves and the direction of movement and sets the values in the jump counter 215. The period of time required therefor is $t_3$. Subsequently, the optical head comes to reach the target guide groove 72 while jumping the guide grooves one by one in accordance with the jump signal D (illustrated at (c) in FIG. 19) delivered from the jump signal generator 216. Herein, in order to correct any error in the jump operation, it is desirable to perform the jump operation in such a manner that, when a plurality of guide grooves have been jumped, the address information of the guide groove currently reached is read out and is acknowledged again.

The embodiment has been described as pulling the light spot into the zero point of the moire signal once. However, when the final velocity at the time at which the content of the down counter 245 has become null under the seek control is small, or when the magnitude of eccentricity is small and the velocity based on the eccentricity of the guide grooves is small, it becomes possible to position the swing arm within the detection range of the tracking signal. It is therefore possible to perform the follow-up control using only the tracking signal. In this case, the setting time $t_2$ is dispensed with.

Further, the present embodiment has referred to the case of employing the swing arm. Therefore, when a moire scale of equal pitches is attached to the coil part of the swing arm, an error develops between a position on the disc surface and the count number of moire pitches. In order to absorb the error, the pitches of the moire scale may be changed in accordance with angles, or the error may be compensated during the calculation of the superior control unit.

This problem is not involved in the actuator, such as the linear motor, which drives the optical head rectilinearly. The present embodiment is also applicable to a structure in which the optical head is placed on the actuator, such as the linear motor, performing a rectilinear motion.

In this manner, according to the present embodiment, the position of the optical head in the access operation can be reliably known by the external scale without reading out the guide groove formed on the disc, and the seek control and the follow-up control can be reliably performed.

Figure 21:
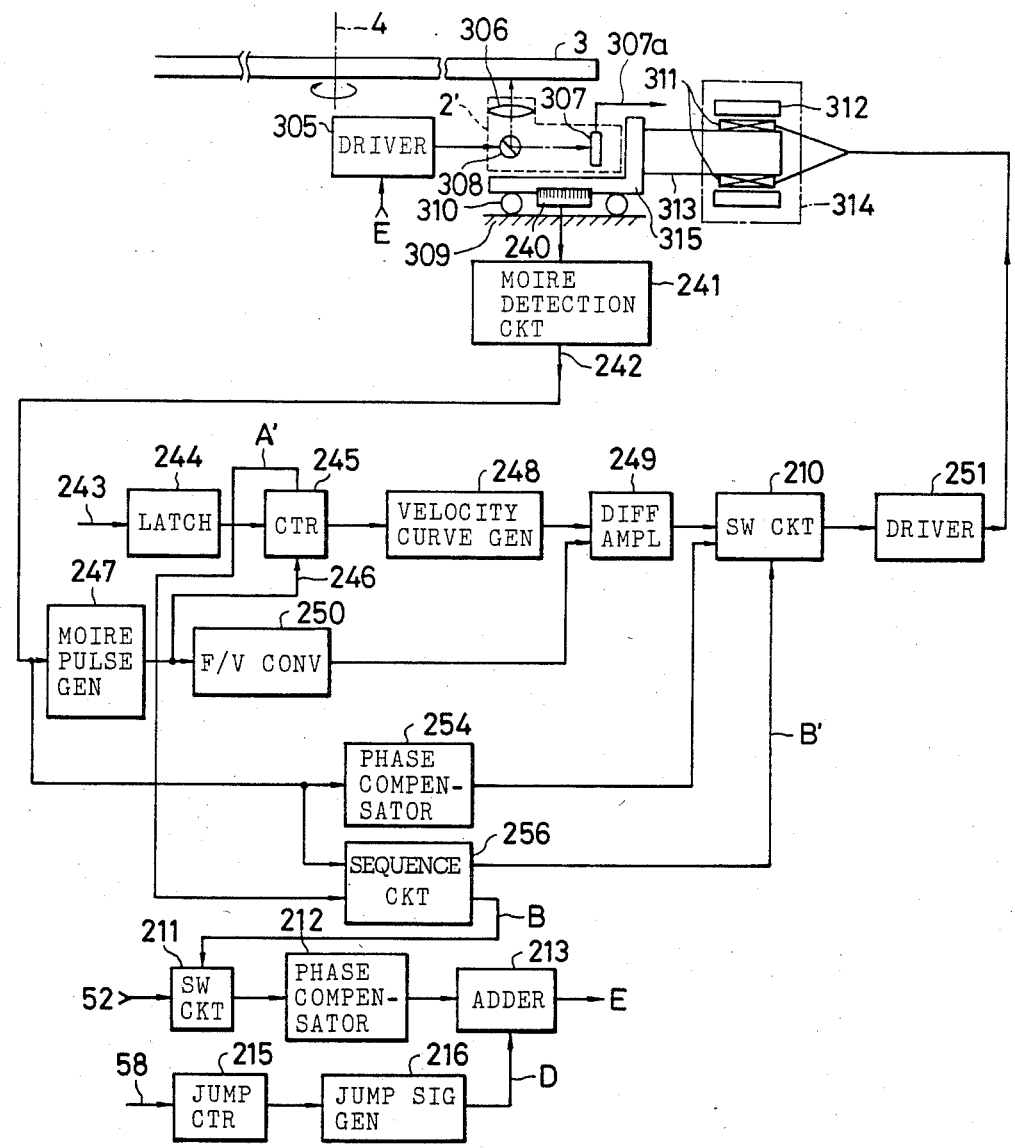
FIG. 21 is a block diagram showing a further embodiment of the present invention.

Now, FIG. 21 shows another embodiment of the present invention. It can execute the positioning of the center line of the guide groove at high precision, likewise to the embodiment of FIG. 12. It is so constructed that a second actuator having a small follow-up range is mounted on an optical head 2', and that the optical head 2' is carried on a first actuator which is not good in the stop precision but which can move over a full radius of the disc, whereby the positioning of high precision is performed over the whole surface of the disc. In the present embodiment, similarly to the embodiment of FIG. 12, the linear motor 314 is used as the first actuator, and the galvano-mirror 308 is used as the second actuator. The moire scale 240 is disposed on a linear carriage 315 as shown in the figure. The arrangement for performing the seek control and positonal control of the linear motor 314 by the use of the moire scale 240, and the access procedure are the same as in the case of FIG. 18. Points of difference will be explained below.

After the linear carriage 315 has been positioned with the moire signal, it is acknowledged that the light spot has fallen within a certain precision (5-10 μm), and the switching signal B for bringing the tracking servo system into the operating state is applied to the switching circuit 211. In addition, the switching circuit 211 is supplied with the tracking signal 52 prepared from the output signal of the photodetector 307. In accordance with the switching signal B, the tracking signal 52 is passed through the compensator 212 via the switching circuit 211 and is applied to one input of the adder 213. The other input of the adder 213 is supplied with the jump signal D. The output E of the adder 213 is applied to the mirror driver 305, the mechanical output of which deflects the mirror 308 so as to perform the tracking.

Also in case of using the external scale as in the present embodiment, it is possible to perform positioning of still higher precision and shortening the access time by employing the two actuators.

Figure 22A:
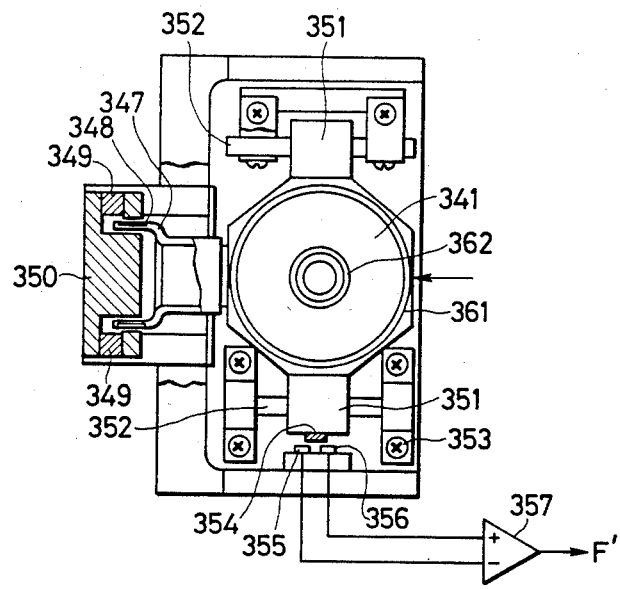
FIGS. 22(a) and 22(b) are views showing the construction of a two-dimensional actuator.
Figure 22B:
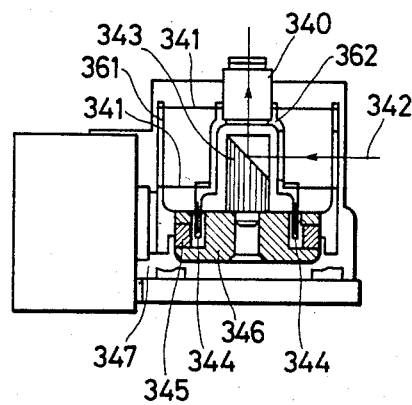

As the second actuator for tracking the limited region in the embodiment of FIG. 12, FIG. 17 or FIG. 21, there is also a two-dimensional actuator which moves the objective in parallel with the optical axis, to effect focusing, and which is moved perpendicularly to the optical axis and in the radial direction of the disc, to effect tracking. An example of such two-dimensional actuator is shown in FIG. 22. It is a mechanism which moves an objective 340 in parallel with an optical axis 342 for the purpose of focusing, and which moves it perpendicularly to the optical axis for the purpose of tracking. (a) of FIG. 22 is a top plan view, while (b) is a side elevational view. The optical axis 342 is curved by a mirror 343, and agrees with the optical axis of the objective 340. The objective 340 is supported by a metallic spiral ring spring 341, and a frame member 361 for keeping the outer peripheral part of the spring is coupled to a supporting portion for driving the track direction. A coil 344 is wound on the lower part of a frame member 362 coupled to the inner peripheral part of the spring, and the objective 340 is driven in parallel with the optical axis by current which is caused to flow through the coil 344 electromagnetically by a magnetic circuit consisting of a permanent magnet 345, a center pole 346 and a yoke. The mirror 343 is coupled on the center pole 346. On the other hand, as seen from FIG. 22(a), a coil 348 is wound on the fore end of the supporting portion 347, and the objective is driven in the radial direction of tracks by a magnetic circuit consisting of a permanent magnet 349, a center pole 350 and a yoke. A plain bearing 351 is coupled to the frame member 361 for keeping the ring spring 341, a shaft 352 lies in contact with the plain bearing 351, and the shaft 352 is mounted on a bed 353 for supporting it and is fixed to a base. In the radial direction of tracks, accordingly, the mechanism for driving the objective in parallel with the optical axis and the mirror 342 are driven unitarily. In the above structure, in case of positioning the tracks by means of a linear motor, the center of the field of view of the lens conforms with the movement of the two-dimensional actuator in the track direction, and hence, the positional deviation of the mechanism supporting the objective 340 and the mirror 342 unitarily may be known.

Herein, a permanent magnet 354 is mounted on the plain bearing 351, and Hall elements 355 and 356 are mounted on the base to which the shaft supporting portion 353 is fixed. When the outputs of the two elements are applied to a differential amplifier 357, the output of this differential amplifier indicates the deviation between the geometrical center of the two Hall elements 355 and 356 and the permanent magnet 354. When the permanent magnet 354 is arranged on the extension of a perpendicular drawn from the optical axis of the objective 340 down to the slide shaft 352, the optical axis of the objective and the positions of the tracks correspond at 1 to 1 in the tracking of the tracks by the two-dimensional actuator, and hence, the output of the differential amplifier 357 represents the deviation between the track and the geometrical center of the Hall elements 355 and 356 set in the linear motor. Accordingly, the output of the differential amplifier 357 is used as the signal F' of the positional control of the linear motor.

Figure 23A:
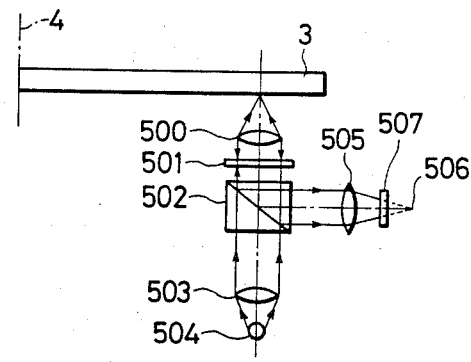
FIGS. 23(a) and 23(b), FIGS. 24(a) and 24(b), FIGS. 25(a) and 25(b) and FIGS. 26(a) and 26(b) are diagrams for explaining methods of detecting a tracking error signal and a total reflected-light quantity signal for use in the present invention.
Figure 23B:
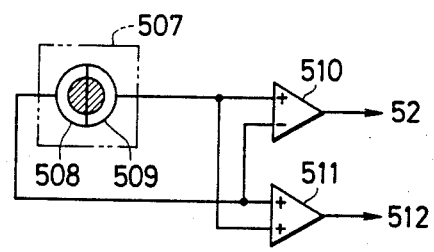

Since, in the above, the method of detecting the information signal and the method of detecting the tracking error signal have not been described in detail, these methods will now be outlined with reference to FIGS. 23, 24 and 25. FIG. 23 is a principle diagram of a tracking signal detecting system which utilizes diffracted light, and FIG. 23(a) shows the simplified arrangement of an optical system. Light rays from a light source 504 (for example, a semiconductor laser) are converted into a collimated beam by a coupling lens 503. The beam is passed through a polarizing beam splitter 502 and a quarter-wavelength plate 501, and is converged by an objective 500 onto a disc 3 which rotates about the axis of rotation 4. The resulting reflected light passes through the objective 500 again and has its polarization plane rotated by 90° with respect to that of the incident light by means of the quarter-wavelength plate. The beam has its optical path curved toward a converging lens 505 by the polarizing beam splitter 502, and is condensed toward a converging point 506 by the converging lens 505. A photodetector 507 is arranged between the converging lens 505 and the convergence point 506. FIG. 23(b) illustrates the structure of the photodetector 507 and means for detecting the tracking signal 52 and the information signal 512. The photodetector 507 is constructed of bisected photodetectors 508 and 509. The tracking signal 52 is obtained in such a way that outputs from these photodetectors have their difference taken by a differential amplifier 510, while the information signal 512 is obtained in such a way that the sum of the outputs of the photodetectors 508 and 509 is taken by an adder 511.

Figure 24A:
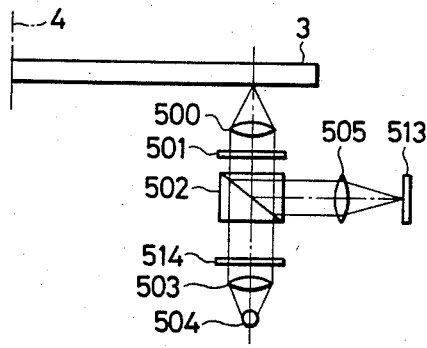
Figure 24B:
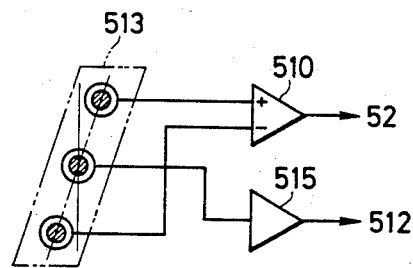

FIG. 24 is a principle diagram of a tracking signal detecting system which employs two spots. In FIG. 24(a), the point of difference from (a) of FIG. 23(a) is that a diffraction grating 514 is arranged behind the coupling lens 503 so as to split the collimated beam into three. Thus, three spots are formed on the surface of the disc. One of them is arranged in the middle of the track, and the remaining two spots are arranged symmetrically in a manner to slightly shift from the middle of the track. When the photodetector 513 is arranged on the convergence point 506 of the converging lens, three spots enclosed with a dotted line are formed thereon as shown in FIG. 24(b). The photodetector 513 is constructed of three independent photodetectors in correspondence with the three spots. An output from the middle photodetector passes through a buffer amplifier 515 and becomes the information signal 512, while outputs from the remaining two photodetectors enter the differential amplifier 510 and generate the tracking signal 52.

Figure 25A:
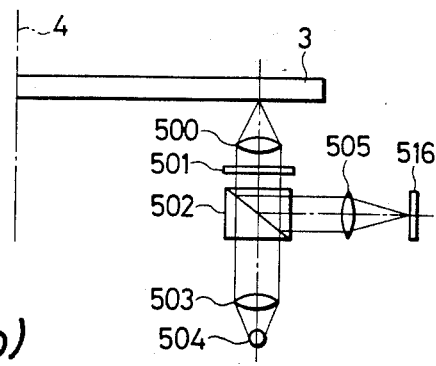
Figure 25B:
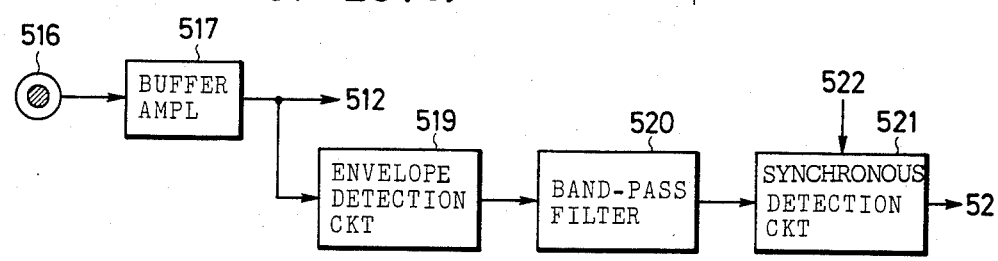

Further, FIG. 25 is a principle diagram of a wobbling or prewobbling tracking signal detection system. In FIG. 25(a), a photodetector 516 is placed at the convergence point 506 of the converging lens 505, and an optical system similar to that of FIG. 23 is constructed. In FIG. 25(b), the photodetector 516 is a photodetector having a single light receiving portion, and a single light spot (hatched area) is formed on the face of the photodetector. When the output of the photodetector 516 is amplified by a buffer amplifier 517, it becomes the information signal 512. This signal is passed through an envelope detection circuit 519 so as to eliminate the influence of a recorded data signal, and it is passed through a band-pass filter 520, the center frequency of which is the frequency of wobbling or prewobbling, so as to extract the wobbling or prewobbling component. Then, it is applied to a synchronous detection circuit 521. The synchronous detection circuit 521 is supplied with the signal 522 of the wobbling frequency having a reference phase, and it performs synchronous detection to provide the tracking signal 52. The signal 522 having the reference phase is produced from the information signal 512 in case of the prewobbling, and it is produced from a signal for driving the optical head or the deflector in the track direction, in case of the wobbling.

Figure 26A:
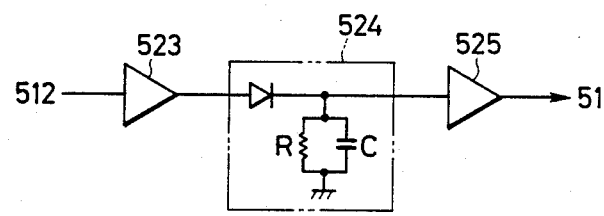
Figure 26B:
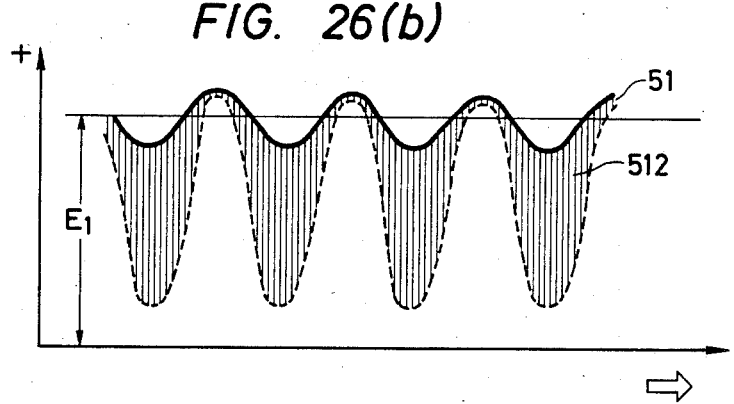

Next, means for detecting the total reflected-light quantity signal 51 from the information signal 512 will be stated. In a case where an information bit 12 is not existent in a guide groove 13, the information signal 512 is equal to the total reflected-light quantity signal 51. In contrast, when the information bit 12 exists, the information signal 512 varies as shown in FIG. 26, in correspondence with FIG. 4(c). A portion enclosed with a solid line and a dotted line denotes the modulation of the reflected light quantity by the information bit. As shown in FIG. 26(a), this signal 512 is applied to an envelope detection circuit 524 through a buffer amplifier 523 and is delivered through a buffer amplifier 525. Then, the total reflected-light quantity signal 51 is obtained. At this time, the values of a capacitor C and a resistor R, which determine the time constant of the envelope detection circuit 524, are so selected that the time constant becomes sufficiently smaller than the lowest repetition frequency due to the information bit in the information signal 512 and becomes sufficiently greater than the highest repetition frequency of the total reflected-light quantity signal 51 at the passage through the guide groove. As regards the tracking signal 52, means similar to the above is applicable in order to eliminate the influence of the information bit. As set forth above, according to the present invention, in an optical disc which is two to one order higher in the track line density than a conventional magnetic disc, a high precision of about 0.1 μm to a target guide groove and an access time equivalent to that of the conventional magnetic disc can be achieved in the presence of the eccentricity of the guide groove, etc.

We claim:
1. An optical memory apparatus comprising:
a recording medium on which predetermined information is optically recorded along guide grooves previously formed in the recording medium and from which it is played back;
projecting means for projecting a laser light beam on the recording medium;
light receiving means for receiving reflected light from the recording medium and providing an output indicative thereof;
means for generating a tracking error signal in response to the output from the light receiving means;
first means for detecting an information signal in the output from the light receiving means and for providing an output;
second means for generating a signal indicative of the direction of passage of the light beam each time the light beam passes through a guide groove in response to the output from said first means and the tracking error signal;
third means for detecting a difference in position between a guide groove where the light beam exists and a target guide groove in response to the signal from said second means and for generating a first control signal for controlling the position of the light beam in accordance with the detected difference; and
light beam position-control means for moving the light beam near to the target guide in response to the first control signal.
2. An optical memory apparatus according to claim 1, wherein the first means includes an envelope detection circuit and provides an output signal indicative of a total reflected-light quantity.
3. An optical memory apparatus according to claim 2, wherein said envelope detection circuit comprises a capacitor and a resistor which determine the time constant of the envelope detection circuit, the values of the capacitor and resistor being selected so that the time constant becomes sufficiently smaller than the lowest repetition frequency due to an information bit in the information signal and becomes sufficiently greater than the highest repetition frequency of the total reflected-light quantity signal at the passage through the guide groove.

4. An optical memory apparatus according to claim 1, wherein said second means includes fourth means for detecting the moment of the passage of the light beam through the guide groove and providing an output indicative thereof, fifth means for detecting a sign of the tracking error signal corresponding to the moment of passage and providing an output indicative thereof, and sixth means for receiving the outputs from the fourth means and the fifth means and for supplying the output of the fourth means to the second means in accordance with the output of the fifth means.

5. An optical memory apparatus according to claim 4, wherein the fourth means further comprises a seventh means for transforming the output of the first means into pulses, and eighth means for generating a pulse output at a change of the pulse output of the seventh means, the fifth means transforming the tracking error signal into pulses, and the sixth means being logic means for supplying the pulse output of the eighth means to the second means in accordance with a level of the pulse output of the fifth means.

6. An optical memory apparatus according to claim 1, wherein said means for generating the tracking error signal includes means for eliminating the influence of information bits in the output of the light receiving means.

7. An optical memory apparatus according to claim 1, further comprising fourth means for generating a second control signal for positioning the light beam to the target guide groove in response to the tracking error signal, fifth means for positioning the light beam to a center line of the target groove in response to the second control signal, and sixth means for switching the first control signal and the second control signal.

8. An optical memory apparatus according to claim 7, wherein the light beam position-control means includes a single actuator having the projection means disposed thereon.

9. An optical memory apparatus according to claim 7, wherein said light beam position-control means includes a first actuator having the projection means disposed thereon, and a second actuator disposed in the projection means, the first actuator being responsive to the first control signal and the second actuator being responsive to the second control signal.

10. An optical memory apparatus according to claim 9, wherein the first actuator includes a linear motor and the second actuator includes a deflection mirror.

11. An optical memory apparatus according to claim 7, further comprising seventh means for generating a jump signal for moving the light beam to the target guide groove when the difference between the guide groove currently read out and the target guide groove is smaller than a predetermined number.

12. An optical memory apparatus comprising:
a recording medium on which predetermined information is optically recorded along tracks from which it is played back, wherein the tracks fluctuate due to at least the eccentricity thereof,
projecting means for projecting a laser beam onto the recording medium as a light spot,
light receiving means for receiving reflected light from the recording medium and providing an output indicative thereof,
means for generating a tracking signal for causing the laser beam to move along the track in response to the output from the light receiving means,
a first actuator for moving the projection means radially with respect to the recording medium,
a second actuator having a rate of response higher than the first actuator for moving the light spot radially on the recording medium to follow the desired track in response to the tracking signal,
detecting means for detecting the movement of the second actuator at least during movement of the second actuator to follow the desired track and for providing an output indicative thereof, and
the first actuator being actuated in response to the output of the detecting means during the movement of the second actuator to follow the desired track so that the extent of displacement of the light spot actuated by the second actuator is smaller than the extent of fluctuation of the desired track and the light spot follows the desired track in accordance with the movement of the first actuator and the second actuator.

13. An optical memory apparatus according to claim 12, wherein the detecting means includes means for electrically detecting the movement of the second actuator in accordance with the tracking signal.

14. An optical memory apparatus according to claim 13, wherein the means for electically detecting includes a low pass filter.

15. An optical memory apparatus according to claim 13, further comprising velocity control means for generating a velocity signal to control the first actuator so that light spot is moved from the track where the light spot currently exists to a position near the desired track when a difference between the current track and the desired track is larger than a predetermined number, and switching means for switching the velocity signal to the output of the detecting means and for supply to the first actuator.

16. An optical memory apparatus according to claim 12, wherein the detecting means includes means for optically detecting the movement of the second actuator.

17. An optical memory apparatus according to claim 16, wherein the means for optically detecting includes projection means for projecting a laser beam on a movable portion of the second actuator, light reception means for receiving reflected light from the portion, and movement detection means for detecting the movement of the portion.

18. An optical memory apparatus according to claim 17, wherein the second actuator includes a deflecting mirror for deflecting the light beam.

19. An optical memory apparatus according to claim 12, wherein the detecting means for magnetically detecting the movement of the second actuator.

20. An optical memory apparatus according to claim 19, wherein the second actuator moves an objective lens perpendicularly to the optical axis and in the radial direction of the recording medium for following the desired track, and the means for magnetically detecting includes deviation detection means for detecting the deviation between the optical axis and the field of view of the objective lens.

21. An optical memory apparatus according to claim 16 or 19, further comprising velocity control means for generating a velocity signal to drive the first actuator so as to move the light spot from a current track to the desired track when a difference between the track currently read out and the track is larger than a predetermined number, first switching means for switching the velocity signal to the output of the detecting means and for supply to the first actuator, and second switching means for switching the output of the detecting means to the tracking signal and for supply to the second actuator.

22. An optical memory apparatus according to claim 12, 16 or 19, further comprising jumping means for generating a jump signal signal for controlling the second actuator and performing a jump by which the laser beam is moved to the desired track when a difference between the track currently read out and the desired track is smaller than a predetermined number.

23. An optical memory apparatus according to claim 22, comprising adder means for adding the jump sign signal to a control signal for the second actuator.

* * * * *